United States Patent
Taruno et al.

(10) Patent No.: US 10,377,521 B2
(45) Date of Patent: Aug. 13, 2019

(54) DELAMINATABLE CONTAINER, METHOD OF CHECKING THE SAME FOR A PINHOLE, AND METHOD OF PROCESSING THE SAME

(71) Applicant: KYORAKU CO., LTD., Kyoto (JP)

(72) Inventors: Shinsuke Taruno, Kanagawa (JP); Tetsuaki Eguchi, Kanagawa (JP); Kousuke Aihara, Kanagawa (JP)

(73) Assignee: KYORAKU CO., LTD., Kyoto (JP)

(*) Notice: Subject to any disclaimer, the term of this patent is extended or adjusted under 35 U.S.C. 154(b) by 325 days.

(21) Appl. No.: 15/100,099

(22) PCT Filed: Nov. 20, 2014

(86) PCT No.: PCT/JP2014/080726
§ 371 (c)(1),
(2) Date: May 27, 2016

(87) PCT Pub. No.: WO2015/080015
PCT Pub. Date: Jun. 4, 2015

(65) Prior Publication Data
US 2017/0029157 A1 Feb. 2, 2017

(30) Foreign Application Priority Data

Nov. 27, 2013 (JP) .................................. 2013-245370
Feb. 12, 2014 (JP) .................................. 2014-024546
(Continued)

(51) Int. Cl.
*B65D 1/02* (2006.01)
*B65D 23/02* (2006.01)
(Continued)

(52) U.S. Cl.
CPC .......... *B65D 1/0215* (2013.01); *B65D 1/0246* (2013.01); *B65D 23/02* (2013.01);
(Continued)

(58) Field of Classification Search
CPC .... B65D 1/0215; B65D 1/0246; B65D 23/02; B65D 41/0442; B65D 77/06;
(Continued)

(56) References Cited

U.S. PATENT DOCUMENTS 3,592,365 A * 7/1971 Schwartzman .... B65D 47/2075
222/209
4,865,224 A 9/1989 Streck
(Continued)

FOREIGN PATENT DOCUMENTS

CN 1268920 A 10/2000
DE 103 57 207 A1 6/2005
(Continued)

OTHER PUBLICATIONS

Japanese Office Action dated May 29, 2018, in connection with corresponding Japan Application No. 2014-094237; 11 pgs.
(Continued)

*Primary Examiner* — Marrit Eyassu
(74) *Attorney, Agent, or Firm* — Maier & Maier, PLLC

(57) ABSTRACT

A delaminatable container, having: a container body having an outer shell and an inner bag, the inner bag delaminating from the outer shell with a decrease in contents and being shrunk. A valve member regulating entrance and exit of air between an external space of the container body and an intermediate space between the outer shell and the inner bag. The container body includes a storage portion and a mouth. The outer shell includes a fresh air inlet communicating the intermediate space with the external space in the storage portion, the valve member includes an axis inserted into the
(Continued)

fresh air inlet, a lid provided on a side of the intermediate space in the axis and having a cross-sectional area greater than that of the axis, and a locking portion provided on a side of the external space.

13 Claims, 21 Drawing Sheets

(30) Foreign Application Priority Data

| | | |
|---|---|---|
| Feb. 19, 2014 | (JP) | ................................ 2014-029702 |
| Feb. 28, 2014 | (JP) | ................................ 2014-038448 |
| Apr. 30, 2014 | (JP) | ................................ 2014-094237 |
| Jun. 2, 2014 | (JP) | ................................ 2014-114411 |

(51) Int. Cl.

| | |
|---|---|
| *B65D 77/06* | (2006.01) |
| *B65D 77/22* | (2006.01) |
| *F16K 15/06* | (2006.01) |
| *F16K 24/06* | (2006.01) |
| *B65D 83/00* | (2006.01) |
| *B65D 41/04* | (2006.01) |
| *B65D 85/72* | (2006.01) |
| *G01M 3/22* | (2006.01) |

(52) U.S. Cl.
CPC ......... *B65D 41/0442* (2013.01); *B65D 77/06* (2013.01); *B65D 77/225* (2013.01); *B65D 83/0055* (2013.01); *B65D 85/72* (2013.01); *F16K 15/06* (2013.01); *F16K 24/06* (2013.01); *G01M 3/226* (2013.01)

(58) Field of Classification Search
CPC .. B65D 77/225; B65D 83/0055; B65D 85/72; F16K 15/06; F16K 24/06; G01M 3/226
USPC .......................................................... 73/40.7
See application file for complete search history.

(56) References Cited

U.S. PATENT DOCUMENTS

| | | | | |
|---|---|---|---|---|
| 5,156,300 | A | * 10/1992 | Spahni | .................. B05B 11/048 222/105 |
| 5,509,738 | A | 4/1996 | Haynes et al. | |
| 6,205,847 | B1 | 3/2001 | Nomoto | |
| 6,266,943 | B1 | 7/2001 | Nomoto et al. | |
| 6,276,558 | B1 | 8/2001 | Kneer | |
| 6,467,653 | B1 * | 10/2002 | Hamamoto | ............ A45D 19/02 222/105 |
| 6,581,803 | B1 * | 6/2003 | Yoshimoto | ......... B65D 83/0055 222/105 |
| 2001/0027154 | A1 | 10/2001 | Nomoto et al. | |
| 2004/0112921 | A1 | 6/2004 | Nomoto et al. | |
| 2005/0023236 | A1 | 2/2005 | Adams et al. | |
| 2006/0226171 | A1 | 10/2006 | Sternberg | |
| 2007/0114485 | A1 | 5/2007 | Adams et al. | |
| 2012/0135335 | A1 | 5/2012 | Adams et al. | |

FOREIGN PATENT DOCUMENTS

| | | | |
|---|---|---|---|
| JP | S60-78770 U | 6/1985 | |
| JP | H04-267727 A | 9/1992 | |
| JP | 3303234 B2 | 6/1996 | |
| JP | 3455606 A | 9/1996 | |
| JP | 2004-149196 A | 5/2004 | |
| JP | 2004149196 A * | 5/2004 | |
| JP | 2007-500925 A | 1/2007 | |
| JP | 2008-137659 A | 6/2008 | |
| JP | 2013-35557 A | 2/2013 | |
| JP | 2013-086855 A | 5/2013 | |
| WO | 2006/107403 A2 | 10/2006 | |
| WO | WO 2006107403 A2 * | 10/2006 | ......... B65D 83/0055 |
| WO | 2009/154446 A1 | 12/2009 | |

OTHER PUBLICATIONS

Japanese Office Action dated May 29, 2018, in connection with corresponding Japan Application No. 2014-114411; 9 pgs.
International Search Report dated Feb. 10, 2015 from corresponding International Patent Application No. PCT/JP2014/080726; 4 pgs.
Chinese Office Action dated Feb. 3, 2017, in connection with corresponding CN Application No. 201480064556.5 (18 pgs., including English translation).
Extended European Search Report dated Nov. 21, 2016, including the Supplementary European Search Report and the European Search Opinion, in connection with corresponding EP Application No. 14865939.4 (7 pgs.).

* cited by examiner

Fig.1(a)
Fig.1(b)
Fig.1(c)
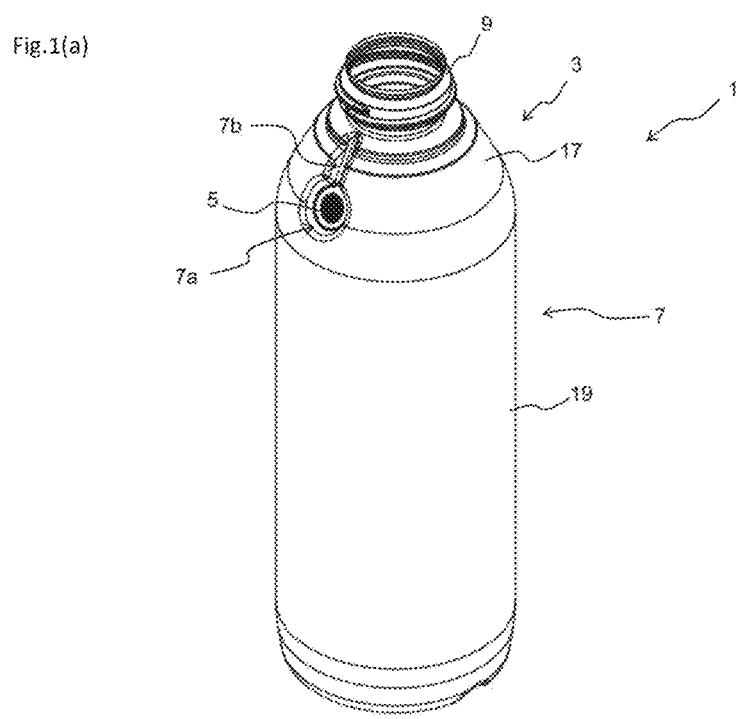
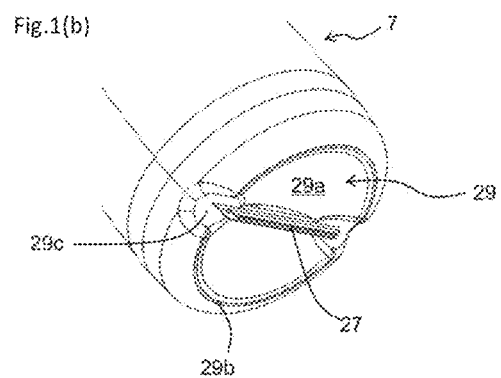
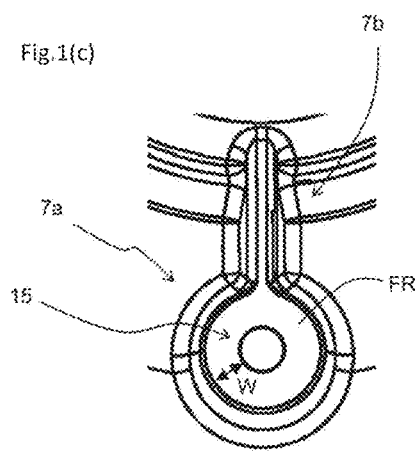

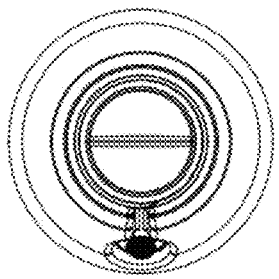
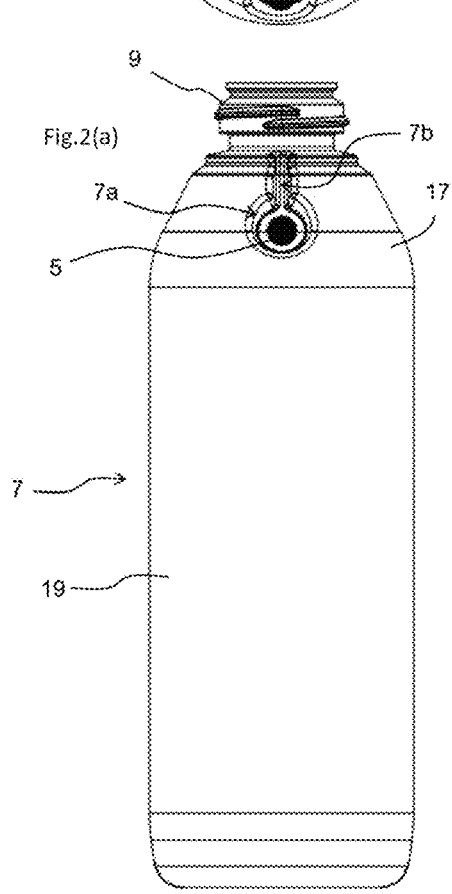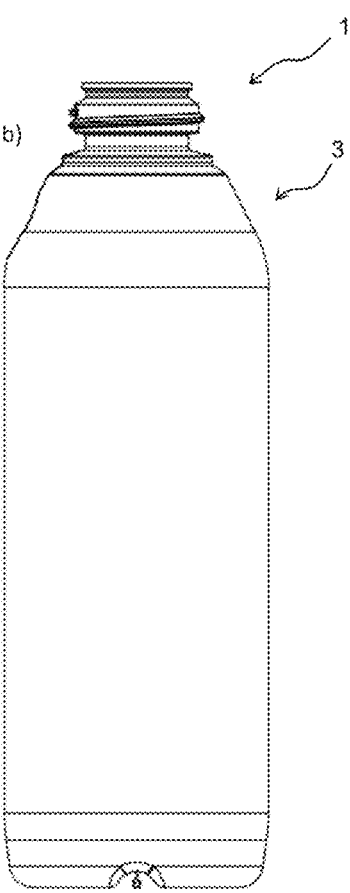
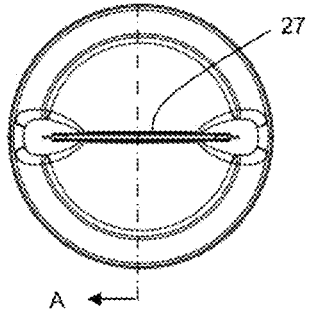

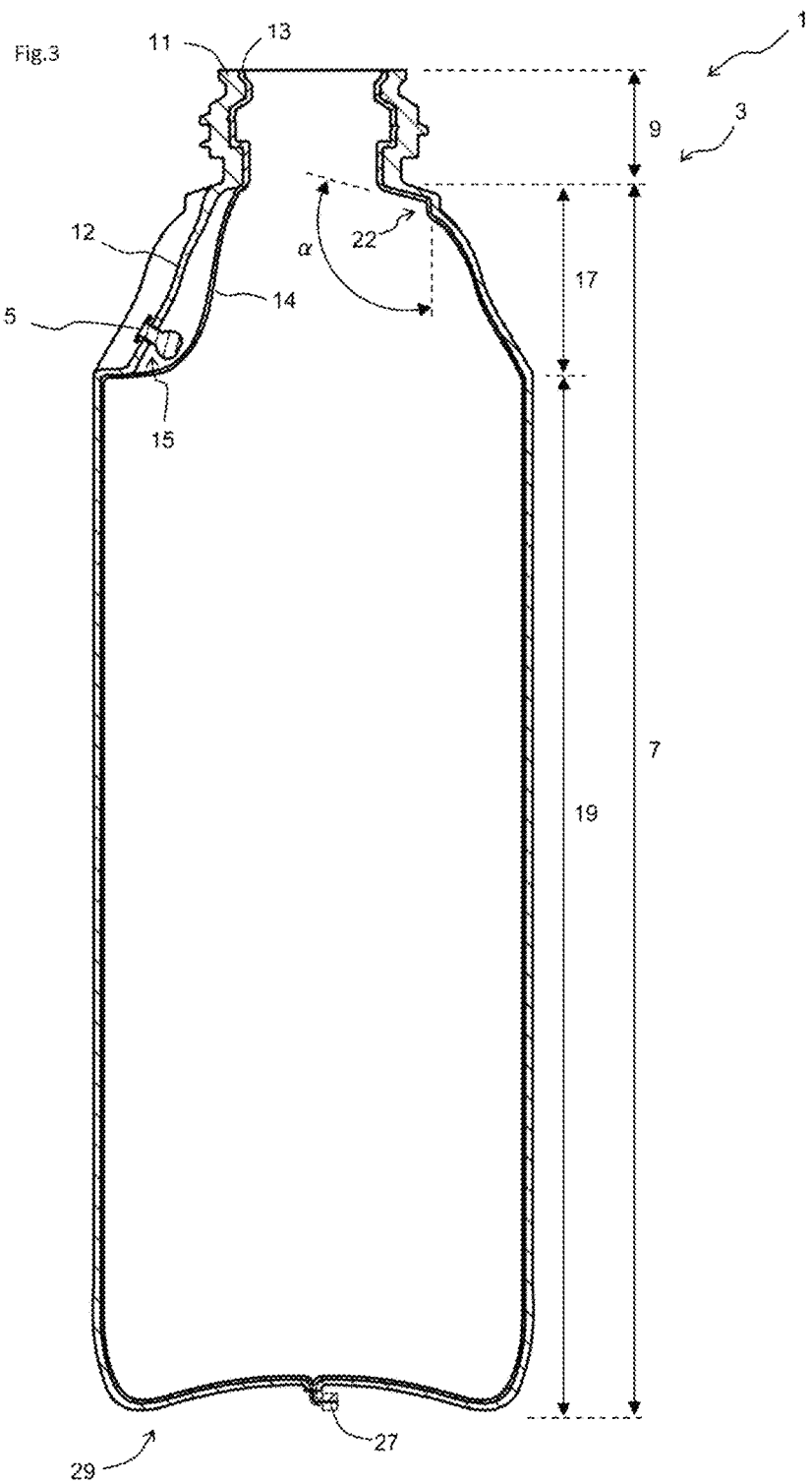

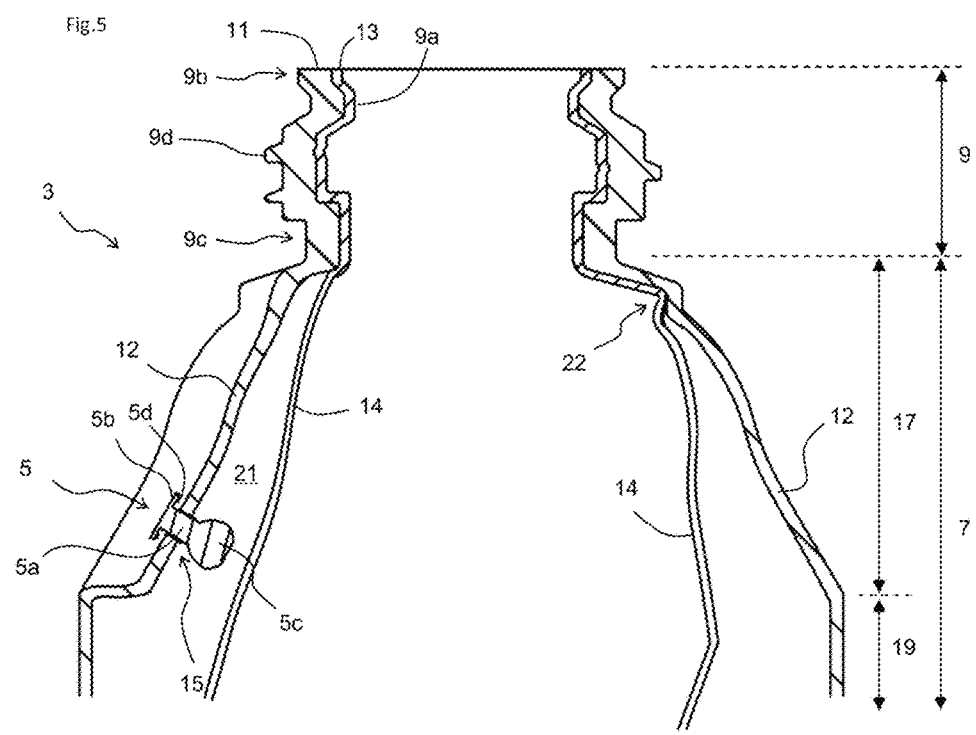

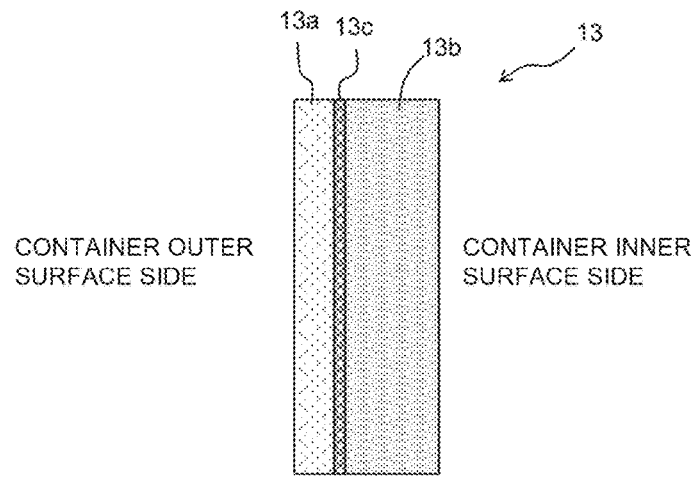
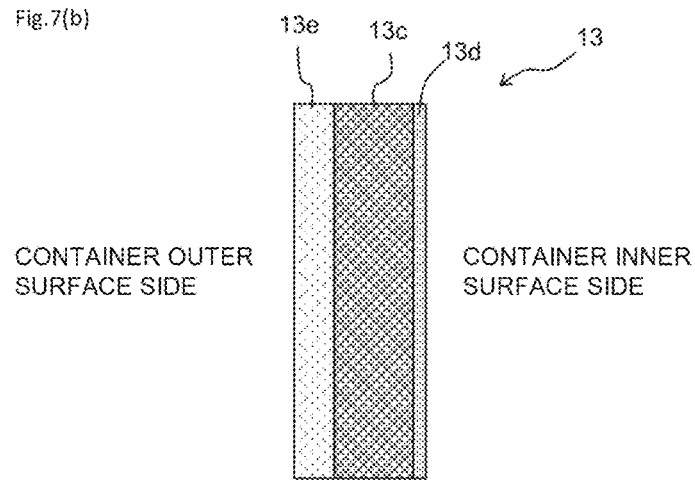

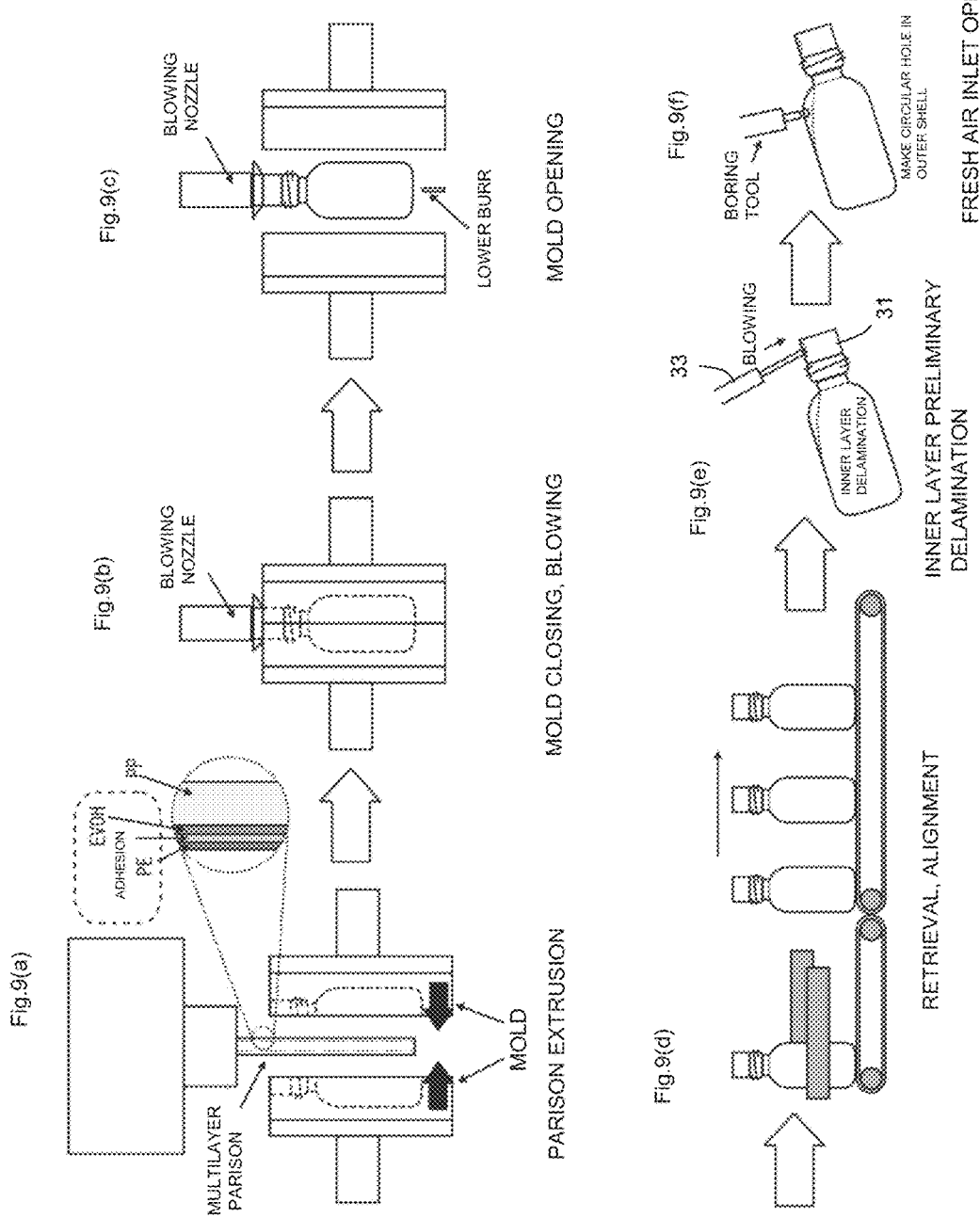

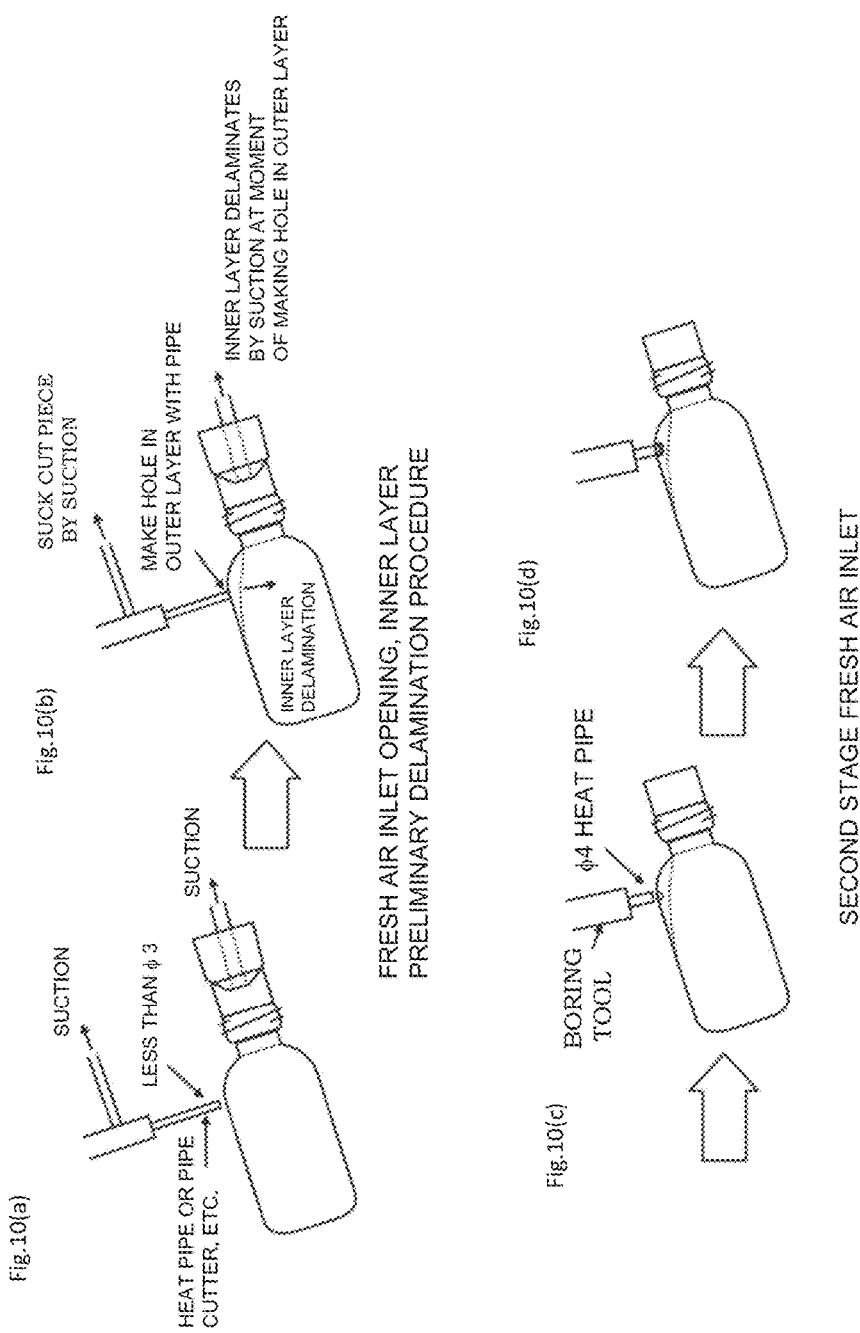

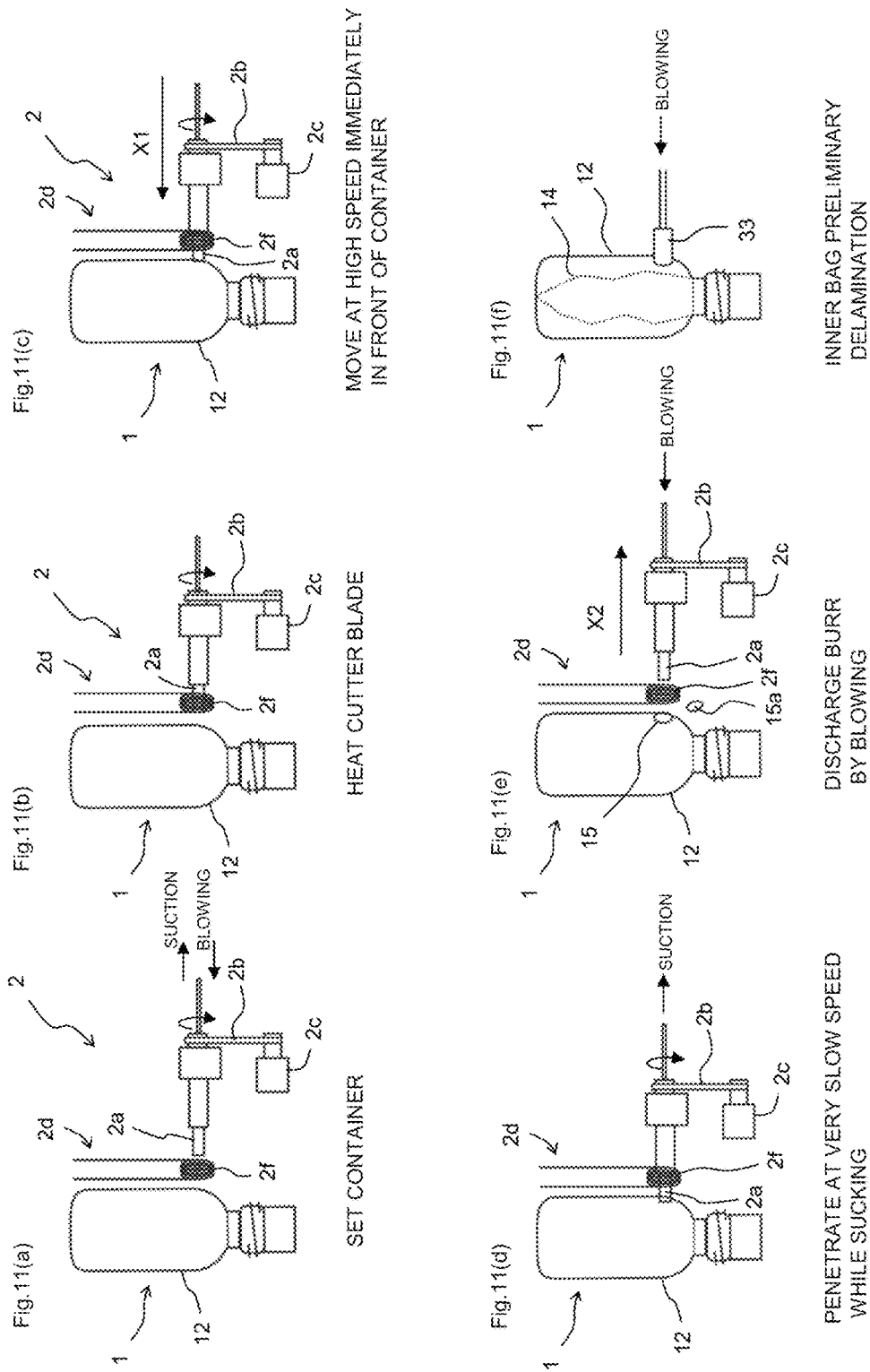

SHARP EDGE SHAPE

ROUNDED EDGE SHAPE

Fig.13(a)
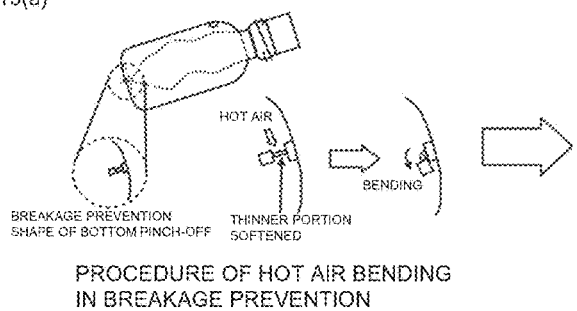
PROCEDURE OF HOT AIR BENDING
IN BREAKAGE PREVENTION
Fig.13(b)
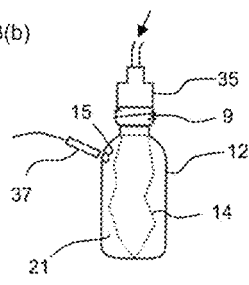
PINHOLE CHECK
Fig.13(c)
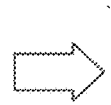
INSERT VALVE MEMBER
INTO FRESH AIR INLET
Fig.13(d)
CUT UPPER
TUBULAR PORTION
Fig.13(e)    Fig.13(f)    Fig.13(g)    Fig.13(h)
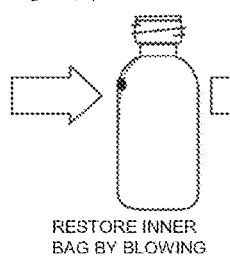      
RESTORE INNER      FILL CONTENTS    CAPPING      SHRINK WRAP
BAG BY BLOWING

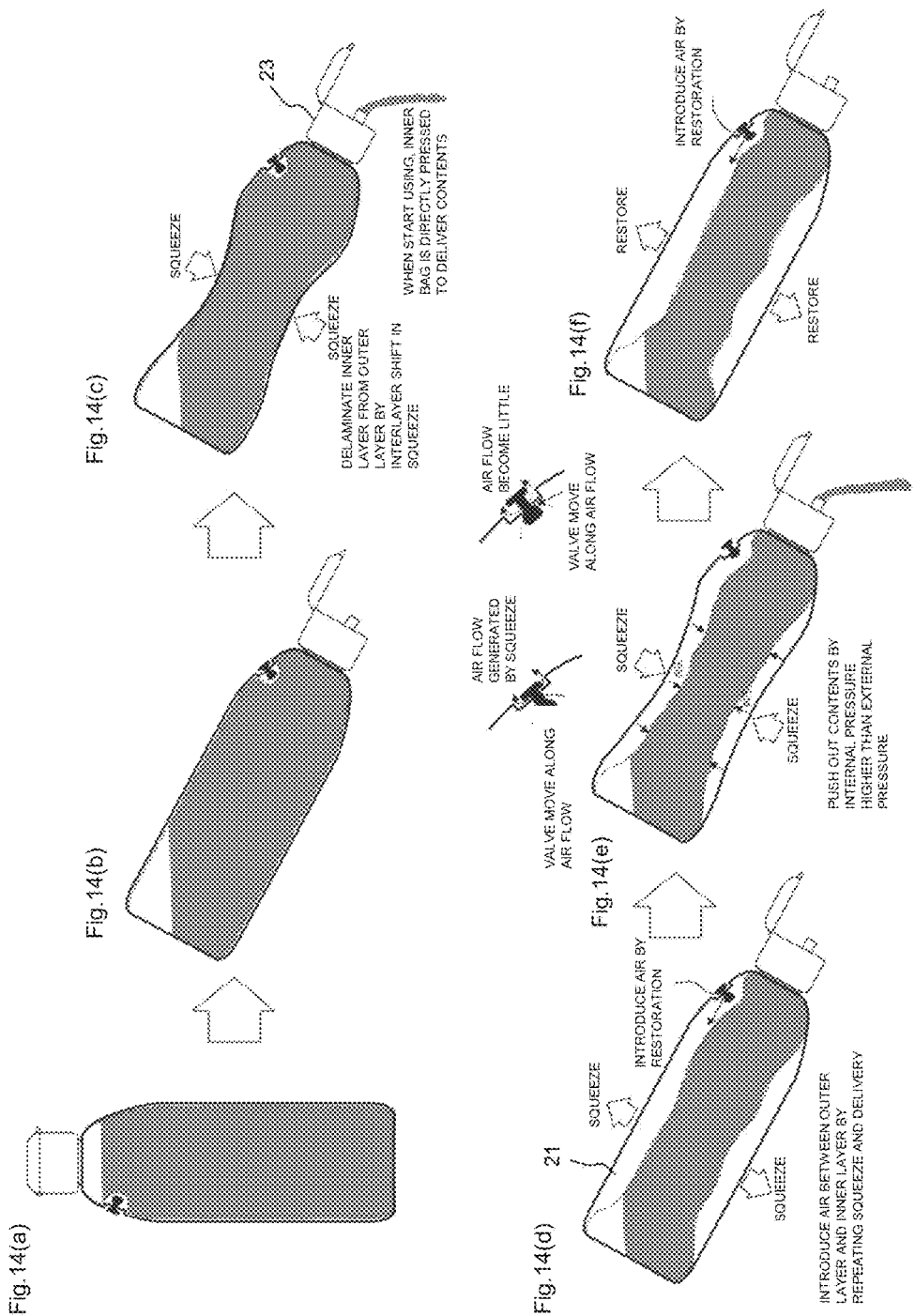

SECOND EMBODIMENT

A-A CROSS-SECTIONAL VIEW

FIRST STRUCTURAL EXAMPLE

SECOND STRUCTURAL EXAMPLE

THIRD STRUCTURAL EXAMPLE

FOURTH STRUCTURAL EXAMPLE

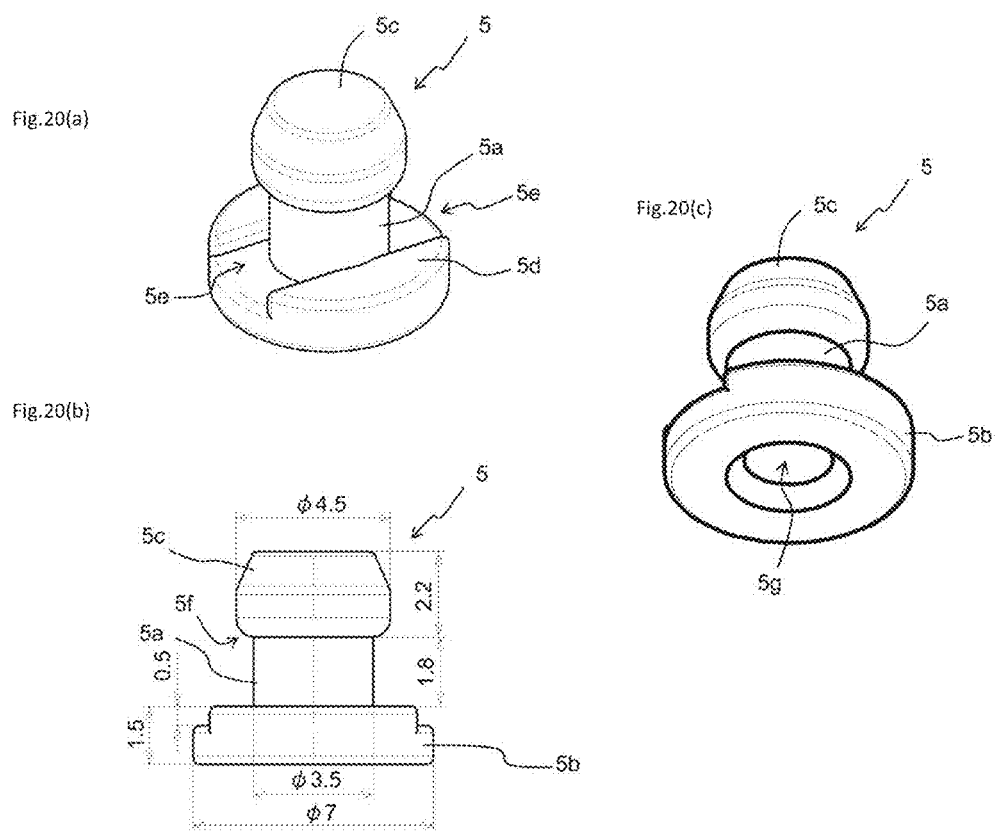

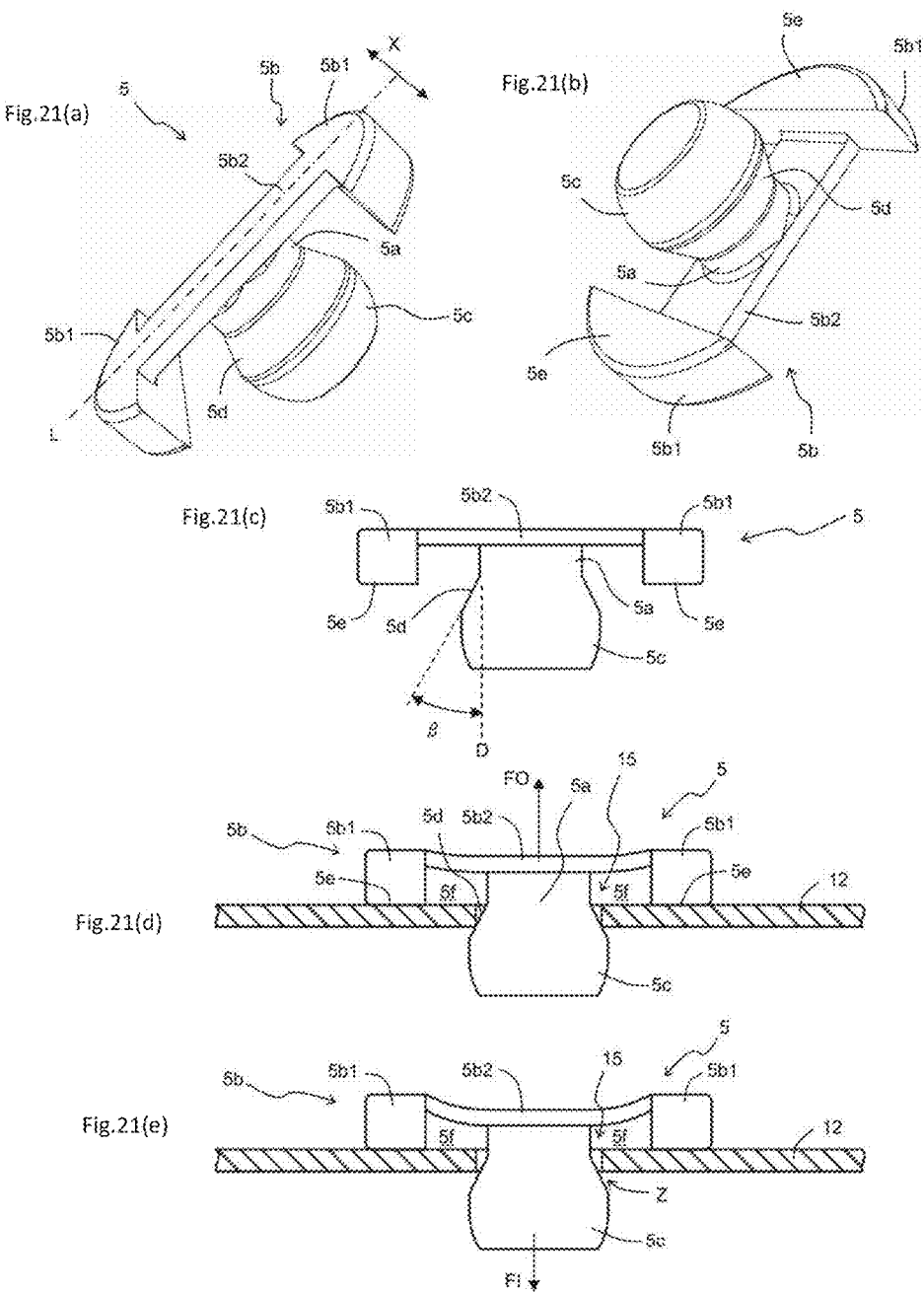

DELAMINATABLE CONTAINER, METHOD OF CHECKING THE SAME FOR A PINHOLE, AND METHOD OF PROCESSING THE SAME

TECHNICAL FIELD

The present invention relates to a delaminatable container in a first aspect, relates to a method of checking a delaminatable container for a pinhole that is capable of confirming whether or not a pinhole is present in an inner bag of the delaminatable container in a second aspect, and relates to a method of processing a delaminatable container that is capable of forming a fresh air inlet in an outer shell of the delaminatable container in a third aspect.

BACKGROUND ART (First Aspect)

Conventionally, delaminatable containers are known that are provided with a container body having an outer shell and an inner bag, the inner bag delaminating from the outer shell and being shrunk with a decrease in the contents, and a check valve to regulate entrance and exit of air between an external space of the container body and an intermediate space between the outer shell and the inner bag (e.g., PTLs and 2).

In PTL 1, a cap mounted to a mouth of the container body has a built-in valve.

In PTL 2, a valve is provided inside a main portion of the outer shell.

(Second Aspect)

Conventionally, delaminatable containers are known that inhibit entrance of air inside the container by an inner layer delaminated from an outer layer and shrunk with a decrease in the contents (e.g., PTL 3). Such delaminatable container is provided with an inner bag composed of the inner layer and an outer shell composed of the outer layer.

In PTL 3, the presence of an aperture in the inner bag is inspected based on whether or not, by supplying air into the inner bag, the pressure in the inner bag reaches a predetermined value after a predetermined time period.

(Third Aspect)

Conventionally, delaminatable containers are known that inhibit entrance of air inside the container by an inner layer delaminated from an outer layer and shrunk with a decrease in the contents (e.g., PTL 4). Such delaminatable container is provided with an inner bag composed of the inner layer and an outer shell composed of the outer layer.

The outer shell of the delaminatable container is provided with a fresh air inlet that enables shrinkage of the inner bag. The fresh air inlet is formed normally using a punch cutter or the like from outside the container where it is not easy to securely form a fresh air inlet in the outer shell without damaging the inner bag.

CITATION LIST

Patent Literature

[PTL 1] JP 2013-35557A
[PTL 2] JP 4-267727A
[PTL 3] Japanese Patent No. 3303234
[PTL 4] Japanese Patent No. 3455606

SUMMARY OF INVENTION

Technical Problem (First Aspect)

The configuration in PTL 1 causes the cap to have a complex structure, which leads to an increase in production costs. The configuration in PTL 2 causes a troublesome procedure to adhere a check valve inside the main portion of the outer shell, resulting in an increase in production costs.

The first aspect of the present invention has been made in view of such circumstances, and it is to provide a delaminatable container excellent in productivity.

(Second Aspect)

The configuration in PTL 3 is capable of detecting a relatively large hole to the extent of affecting the pressure in the inner bag while it is difficult to find a hole smaller than that.

The second aspect of the present invention has been made in view of such circumstances, and it is to provide a method of checking for a pinhole that is capable of detecting with high accuracy whether or not a pinhole is present in an inner bag of a delaminatable container.

(Third Aspect)

In PTL 4, the fresh air inlet is formed in the mouth from the mouth outer surface side by, in a state of causing a bearer to abut on the mouth inner surface, bringing the cutter blade at the end of the punch cutter in proximity to the bearer. Then, by setting a gap between the bearer and the cutter blade not to be in a predetermined distance or less, it is prevented that the cutter blade damages the inner bag of the delaminatable container.

However, the method in PTL 4 has a problem that it is difficult to form a fresh air inlet in a portion other than the mouth of the container.

The third aspect of the present invention has been made in view of such circumstances, and it is to provide a method of processing a delaminatable container that is capable of forming a fresh air inlet in an arbitrary position of the outer shell of the container.

Solution to Problem (First Aspect)

According to the first aspect of the present invention, a delaminatable container is provided that includes: a container body having an outer shell and an inner bag, the inner bag delaminating from the outer shell with a decrease in contents and being shrunk; and a valve member regulating entrance and exit of air between an external space of the container body and an intermediate space between the outer shell and the inner bag, wherein the container body includes a storage portion to store the contents and a mouth to discharge the contents from the storage portion, the outer shell includes a fresh air inlet communicating the intermediate space with the external space in the storage portion, the valve member includes an axis inserted into the fresh air inlet, a lid provided on a side of the intermediate space in the axis and having a cross-sectional area greater than that of the axis, and a locking portion provided on a side of the external space in the axis and preventing entrance of the valve member to the intermediate space.

Based on intensive examinations by the present inventors, the check valve is considered to be achieved by a valve member, which is separate from the container body. Then, the valve member is composed of an axis, a lid, and a locking portion 5b, and when manufactured, the lid is inserted by being pressed into the fresh air inlet in the outer shell from outside the outer shell to allow the valve member to be locked to the outer shell. According to such structure, a cap does not have to be provided with a check valve and the valve member is readily mounted, and thus the structure is simply and the productivity is high.

Various embodiments in the first aspect of the present invention are exemplified below. The embodiments described below may be combined with each other.

It is preferred that the axis is capable of sliding movement relative to the fresh air inlet.

It is preferred that the lid is configured to substantially close the fresh air inlet when the outer shell is compressed.

It is preferred that the lid has a smaller cross-sectional area as coming closer to the axis.

It is preferred that the lid and the axis as a boundary between them in a curved shape bulged toward outside.

It is preferred that the locking portion is configured to be capable of introducing air in the intermediate space when the outer shell is restored after compression.

It is preferred that the locking portion has a projection or a groove on a side of the outer shell.

It is preferred that the outer shell includes at least one of configurations (1) and (2) below:

(1) the fresh air inlet is provided on an inclined surface of the outer shell; and (2) on an outer surface side of the outer shell, a flat region is provided with a width of 3 mm or more surrounding the fresh air inlet.

It is found that, when a surface to be provided with the fresh air inlet is vertical, the delaminated inner bag sometimes makes contact with the valve member to interfere with movement of the valve member. According to review to solve the problem, it is found that the above problem is prevented by, as the above configuration (1), disposing the fresh air inlet in an inclined surface of the outer shell.

The outer surface of the outer shell is sometimes provided with a flat region surrounding the fresh air inlet. It is found that, in the case that the flat region is narrow, the close adherence between the valve member and the outer shell is not good when the valve member closes the fresh air inlet and air leakage sometimes occurs through the fresh air inlet. According to review to solve the problem, it is found that when a flat region is provided in a range of 3 mm or more surrounding the fresh air inlet on the outer surface of the outer shell, as the above configuration (2), the close adherence between the valve member and the outer shell is improved and thus air leakage through the fresh air inlet is inhibit.

It is preferred that the outer shell includes the configuration (1), and the inclined surface has an inclination angle from 45 to 89 degrees.

It is preferred that the outer shell includes the configuration (2), and an inner surface of the outer shell has a radius of curvature of 200 mm or more in a range of 2 mm surrounding the fresh air inlet.

It is preferred that the locking portion includes a pair of foundation portions and a bridge portion provided between the foundation portions, and the axis is provided in the bridge portion.

According to further review by the present inventors, it is found that air leakage through the fresh air inlet occurs from starting compression of the outer shell until closing the fresh air inlet by the lid, and as a result, delivery of the contents sometimes becomes insufficient. According to review to solve such problem, a configuration is created where a locking portion is composed of a pair of foundation portions and a bridge portion provided between them and an axis is provided to the bridge portion. According to such structure, using the bridge portion functioning as a flat spring, it is possible to create a biasing force in a direction pressing the lid against the outer shell. It is then found that the biasing force presses the lid against the outer shell to reduce the time after starting compression of the outer shell until the fresh air inlet is closed by the lid and thus it is possible to inhibit air leakage.

It is preferred that the valve member is configured to, in a state of being mounted in the fresh air inlet, abut on the outer shell with the foundation portions and cause the bridge portion to deflect.

It is preferred that the lid is provided with a tapered surface having a smaller cross-sectional area as coming closer to the axis.

It is preferred that the tapered surface has an inclination angle from 15 to 45 degrees to a direction extending the axis.

(Second Aspect)

According to the second aspect of the present invention, a method of checking a delaminatable container for a pinhole is provided, the delaminatable container provided with a container body having a storage portion to store contents and a mouth to deliver the contents from the storage portion and also having an outer shell and an inner bag, the inner bag delaminating from the outer shell and being shrunk with a decrease in the contents, the outer shell including a fresh air inlet communicating an external space of the container body with an intermediate space between the outer shell and the inner bag, the method includes:

preliminary delaminating, preliminary delaminating the inner bag from the outer shell;

gas injecting, injecting an inspection gas containing a specific type of gas in the inner bag or the intermediate space; and sensing, sensing leakage of the specific type of gas through the inner bag.

In the method of the second aspect of the present invention, whether or not a pinhole is present in an inner bag is checked by injecting an inspection gas containing a specific type of gas in a delaminatable container and sensing leakage of the specific type of gas through the inner bag. According to such method, the presence of a pinhole is detected accurately even when a pinhole in the inner bag is very small in size, which substantially does not affect the pressure in the inner bag.

Various embodiments in the second aspect of the present invention are exemplified below. The embodiments described below may be combined with each other.

It is preferred that the inspection gas is injected in the inner bag from the mouth, and the specific type of gas leaked to the intermediate space is sensed.

It is preferred that the specific type of gas is sensed by a sensor arranged in proximity to the fresh air inlet of the delaminatable container.

It is preferred that the specific type of gas is a type of gas in an amount present in in air of 1% or less.

It is preferred that the specific type of gas is at least one selected from hydrogen, carbon dioxide, helium, argon, and neon.

It is preferred that the inspection gas is at an injection pressure from 1.5 to 4.0 kPa.

(Third Aspect)

According to the third aspect of the present invention, a method of processing a delaminatable container is provided, the container provided with a container body having a storage portion to store contents and a mouth to deliver the contents from the storage portion and also having an outer shell and an inner bag, the inner bag delaminating from the outer shell and being shrunk with a decrease in the contents, the method includes:

forming a fresh air inlet in the outer shell by moving, while rotating, a heated tubular cutter blade to press an edge of the cutter blade against the outer shell.

In the method of the third aspect of the present invention, a fresh air inlet is readily formed in an outer shell without strongly pressing a cutter blade against the outer shell because, while a heated tubular cutter blade is rotated, its edge is pressed against the outer shell.

Various embodiments in the third aspect of the present invention are exemplified below. The embodiments described below may be combined with each other.

It is preferred that the inner bag has an outermost layer composed of a resin having a melting point higher than a melting point of a resin contained in an innermost layer of the outer shell.

It is preferred that the cutter blade is heated by electromagnetic induction by a coil arranged adjacent to the delaminatable container.

It is preferred that the edge of the cutter blade is pressed against the outer shell while a suction force is exerted on the edge of the cutter blade.

It is preferred that the edge of the cutter blade is rounded.

It is preferred that the cutter blade is moved to be pressed against the inner bag until the edge of the cutter blade moves beyond an interface between the outer shell and the inner bag.

It is preferred that the method further includes preliminary delaminating the inner bag from the outer shell by blowing air between the outer shell and the inner bag through the fresh air inlet after formation of the fresh air inlet.

Among the Examples described later, a first experimental example relates to a shape of a valve member, a second experimental example relates to a shape of a mounting portion of a valve member, a third experimental example relates to effects of using a random copolymer for the outer layer, and a fourth experimental example relates to effects of making an innermost layer of an inner layer as an EVOH layer. The third experimental example relates to the first aspect of the present invention and the fourth experimental example relates to the second aspect of the present invention.

BRIEF DESCRIPTION OF DRAWINGS

FIG. 1 are perspective views illustrating a structure of a delaminatable container 1 in a first embodiment of the present invention, where (a) illustrates an overall view, (b) illustrates the bottom, and (c) illustrates an enlarged view of and around a valve member mounting recess 7a. FIG. 1(c) illustrates a state of removing a valve member 5.

FIG. 2 illustrate the delaminatable container 1 in FIG. 1, where (a) is a front view, (b) is a rear view, (c) is a plan view, and (d) is a bottom view.

FIG. 3 is an A-A cross-sectional view in FIG. 2(d). Note that FIGS. 1 through 2 illustrate states before bending a bottom seal protrusion 27 and FIG. 3 illustrates a state after bending the bottom seal protrusion 27.

FIG. 5 illustrates a state where delamination of an inner layer 13 proceeds from the state in FIG. 4.

FIGS. 7(a) and 7(b) are cross-sectional views illustrating a layer structure of the inner layer 13.

FIG. 9 illustrate a procedure of manufacturing the delaminatable container 1 in FIG. 1.

FIG. 10 illustrate another example of inner layer preliminary delamination and fresh air inlet formation procedures.

FIG. 11 illustrate another example of the inner layer preliminary delamination and fresh air inlet formation procedures.

FIG. 13 illustrate the procedure of manufacturing the delaminatable container 1 in FIG. 1 following FIG. 11.

FIG. 14 illustrate a method of using the delaminatable container 1 in FIG. 1.

FIG. 20 illustrate a fifth structural example of the valve member 5, where (a) is a perspective view, (b) is a front view, and (c) is a perspective view taken from the bottom surface side.

FIG. 21 illustrate a valve member 5 of a delaminatable container 1 in a third embodiment of the present invention, where (a) and (b) are perspective views of the valve member 5, (c) is a front view of the valve member 5, and (d) through (e) are front views a state of mounting the valve member 5 in a fresh air inlet 15 (an outer shell 12 is shown in a cross-sectional view).

DESCRIPTION OF EMBODIMENTS

Figure 4:
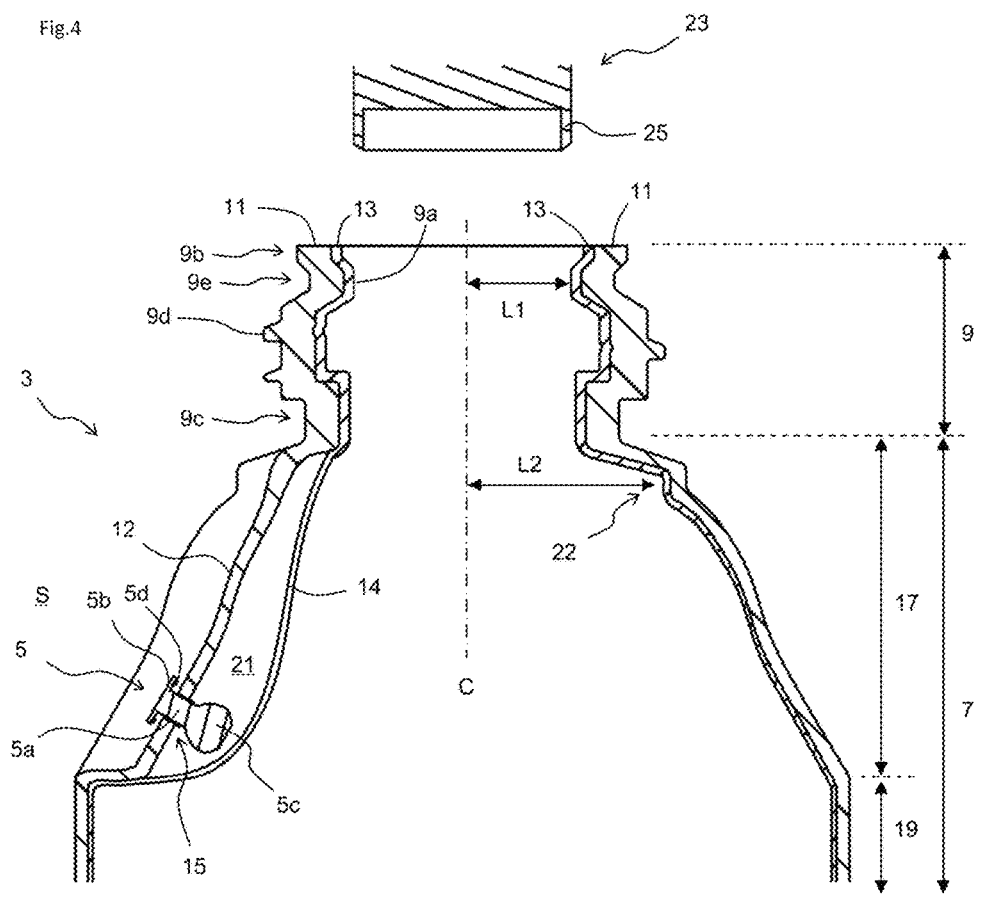
FIG. 4 is an enlarged view of a region including a mouth 9 in FIG. 3.

Embodiments of the present invention are described below. Various characteristics in the embodiments described below may be combined with each other. Each characteristic is independently inventive.

1. First Embodiment

As illustrated in FIGS. 1 through 2, a delaminatable container 1 in the first embodiment of the present invention is provided with a container body 3 and a valve member 5. The container body 3 is provided with a storage portion 7 to store the contents and a mouth 9 to deliver the contents from the storage portion 7.

As illustrated in FIG. 3, the container body 3 is provided with an outer layer 11 and an inner layer 13 in the storage portion 7 and the mouth 9. An outer shell 12 is composed of the outer layer 11 and an inner bag 14 is composed of the inner layer 13. Due to delamination of the inner layer 13 from the outer layer 11 with a decrease in the contents, the inner bag 14 delaminates from the outer shell 12 to be shrunk.

As illustrated in FIG. 4, the mouth 9 is equipped with external threads 9d. To the external threads 9d, a cap, a pump, or the like having internal threads is mounted. FIG. 4 partially illustrates a cap 23 having an inner ring 25. The inner ring 25 has an outer diameter approximately same as an inner diameter of the mouth 9. An outer surface of the inner ring 25 abuts on an abutment surface 9a of the mouth 9, thereby preventing leakage of the contents. In the present embodiment, the mouth 9 is equipped with an enlarged diameter portion 9b at the end. The enlarged diameter portion 9b has an inner diameter greater than the inner diameter in an abutment portion 9e, and thus the outer surface of the inner ring 25 does not make contact with the enlarged diameter portion 9b. When the mouth 9 does not have the enlarged diameter portion 9b, a defect sometimes occurs in which the inner ring 25 enters between the outer layer 11 and the inner layer 13 in the case where the mouth 9 has an even slightly smaller inner diameter due to variations in manufacturing. In contrast, when the mouth 9 has the enlarged diameter portion 9b, such defect does not occur even in the case where the mouth 9 has a slightly varied inner diameter.

The mouth 9 is also provided with an inner layer support portion 9c to inhibit slip down of the inner layer 13 in a position closer to the storage portion 7 than the abutment portion 9e. The inner layer support portion 9c is formed by providing a narrow part in the mouth 9. Even when the mouth 9 is equipped with the enlarged diameter portion 9b, the inner layer 13 sometimes delaminates from the outer layer 11 due to friction between the inner ring 25 and the inner layer 13. In the present embodiment, even in such case, the inner layer support portion 9c inhibits slip down of the inner layer 13, and thus it is possible to inhibit falling out of the inner bag 14 in the outer shell 12.

As illustrated in FIGS. 3 through 5, the storage portion 7 is provided with a main portion 19 having an approximately constant cross-sectional shape in longitudinal directions of the storage portion and a shoulder portion 17 linking the main portion 19 to the mouth 9. The shoulder portion 17 is equipped with a bent portion 22. The bent portion 22 is an area with a bending angle α illustrated in FIG. 3 of 140 degrees or less and having a radius of curvature on a container inner surface side of 4 mm or less. Without the bent portion 22, the delamination between the inner layer 13 and the outer layer 11 sometimes extends from the main portion 19 to the mouth 9 to delaminate the inner layer 13 from the outer layer 11 even in the mouth 9. The delamination of the inner layer 13 from the outer layer 11 in the mouth 9 is, however, undesirable because the delamination of the inner layer 13 from the outer layer 11 in the mouth 9 causes falling out of the inner bag 14 in the outer shell 12. Since the bent portion 22 is provided in the present embodiment, even when delamination between the inner layer 13 and the outer layer 11 extends from the main portion 19 to the bent portion 22, the inner layer 13 is bent at the bent portion 22 as illustrated in FIG. 5 and the force to delaminate the inner layer 13 from the outer layer 11 is not transmitted to the area above the bent portion 22. As a result, the delamination between the inner layer 13 and the outer layer 11 in the area above the bent portion 22 is inhibited. Although, in FIGS. 3 through 5, the bent portion 22 is provided in the shoulder portion 17, the bent portion 22 may be provided at the boundary between the shoulder portion 17 and the main portion 19.

Although the lower limit of bending angle α is not particularly defined, it is preferably 90 degrees or more for ease of manufacture. Although the lower limit of the radius of curvature is not particularly defined, it is preferably 0.2 mm or more for ease of manufacture. In order to prevent delamination of the inner layer 13 from the outer layer 11 in the mouth 9 more securely, the bending angle α is preferably 120 degrees or less and the radius of curvature is preferably 2 mm or less. Specifically, the bending angle α is, for example, 90, 95, 100, 105, 110, 115, 120, 125, 130, 135, and 140 degrees or it may be in a range between any two values exemplified here. Specifically, the radius of curvature is, for example, 0.2, 0.4, 0.6, 0.8, 1, 1.2, 1.4, 1.6, 1.8, and 2 mm or it may be in a range between any two values exemplified here.

As illustrated in FIG. 4, the bent portion 22 is provided in a position where a distance L2 from a container center axis C to the container inner surface in the bent portion 22 is 1.3 times or more of a distance L1 from the container center axis C to the container inner surface in the mouth 9. The delaminatable container 1 in the present embodiment is formed by blow molding. The larger L2/L1 causes a larger blow ratio in the bent portion 22, which results in a thinner thickness. When L2/L1≥1.3, the thickness of the inner layer 13 in the bent portion 22 thus becomes sufficiently thin and the inner layer 13 is easily bent at the bent portion 22 to more securely inhibit delamination of the inner layer 13 from the outer layer 11 in the mouth 9. L2/L1 is, for example, from 1.3 to 3 and preferably from 1.4 to 2. Specifically, L2/L1 is, for example, 1.3, 1.4, 1.5, 1.6, 1.7, 1.8, 1.9, 2, 2.5, and 3 or it may be in a range between any two values exemplified here.

To give an example, the thickness in the mouth 9 is from 0.45 to 0.50 mm, the thickness in the bent portion 22 is from 0.25 to 0.30 mm, and the thickness of the main portion 19 is from 0.15 to 0.20 mm. The thickness in the bent portion 22 is thus sufficiently less than the thickness in the mouth 9, thereby effectively exhibiting functions of the bent portion 22.

As illustrated in FIG. 4, the storage portion 7 is equipped with the valve member 5 to regulate entrance and exit of air between an external space S of the container body 3 and an intermediate space 21 between the outer shell 12 and the inner bag 14. The outer shell 12 is equipped with a fresh air inlet 15 communicating with the intermediate space 21 and the external space S in the storage portion 7. The fresh air inlet 15 is a through hole provided only in the outer shell 12 and does not reach the inner bag 14. The valve member 5 is provided with an axis 5a inserted into the fresh air inlet 15, a lid 5c provided on the intermediate space 21 side of the axis 5a and having a cross-sectional area greater than that of the axis 5a, and a locking portion 5b provided on the external space S side of the axis 5a and preventing entrance of the valve member 5 to the intermediate space 21. In the present embodiment, the axis 5a is capable of sliding movement relative to the fresh air inlet 15.

The lid 5c is configured to substantially close the fresh air inlet 15 when the outer shell 12 is compressed and shaped to have a smaller cross-sectional area as coming closer to the axis 5a. The locking portion 5b is configured to be capable of introducing air in the intermediate space 21 when the outer shell 12 is restored after compression. When the outer shell 12 is compressed, the pressure in the intermediate space 21 becomes higher than external pressure and the air in the intermediate space 21 leaks outside from the fresh air inlet 15. The pressure difference and the air flow cause the lid 5c to move toward the fresh air inlet 15 to close the fresh air inlet 15 by the lid 5c. Since the lid 5c has a shape with a smaller cross-sectional area as coming closer to the axis 5a, the lid 5c readily fits into the fresh air inlet 15 to close the fresh air inlet 15.

When the outer shell 12 is further compressed in this state, the pressure in the intermediate space 21 is increased, and as a result, the inner bag is compressed to deliver the contents in the inner bag 14. When the compressive force to the outer shell 12 is released, the outer shell 12 attempts to restore its shape by the elasticity of its own. At this point, the lid 5c is separated from the fresh air inlet 15 and the closure of the fresh air inlet 15 is released to introduce fresh air in the intermediate space 21. Not to cause the locking portion 5b to close the fresh air inlet 15, the locking portion 5b is equipped with projections 5d in a portion abutting on the outer shell 12. The projections 5d abut on the outer shell 12 to provide gaps between the outer shell 12 and the locking portion 5b. Instead of providing the projections 5d, closure of the fresh air inlet 15 by the locking portion 5b may be prevented by providing grooves in the locking portion 5b. FIGS. 8 and 16 through 20 illustrate specific examples of the structure of the valve member 5.

The valve member 5 is mounted to the container body 3 by inserting the lid 5c into the intermediate space 21 while the lid 5c presses and expands the fresh air inlet 15. The lid 5c, therefore, preferably has an end in a tapered shape. Since such valve member 5 can be mounted only by pressing the lid 5c from outside the container body 3 into the intermediate space 21, it is excellent in productivity.

After the valve member 5 is mounted, the storage portion 7 is covered with a shrink film. At this point, not to allow the valve member 5 to interfere with the shrink film, the valve member 5 is mounted to a valve member mounting recess 7a provided in the storage portion 7. Not to seal the valve member mounting recess 7a with the shrink film, an air circulation groove 7b extending from the valve member mounting recess 7a in the direction of the mouth 9 is provided.

The valve member mounting recess 7a is provided in the shoulder portion 17 of the outer shell 12. The shoulder portion 17 is an inclined surface, and a flat region FR is provided in the valve member mounting recess 7a. Since the flat region FR is provided approximately in parallel with the inclined surface of the shoulder portion 17, the flat region FR is also an inclined surface. Since the fresh air inlet 15 is provided in the flat region FR in the valve member mounting recess 7a, the fresh air inlet 15 is provided in the inclined surface. When the fresh air inlet 15 is provided in, for example, a vertical surface of the main portion 19, there is a risk that the once delaminated inner bag 14 makes contact with the valve member 5 to interfere with movement of the valve member 5. In the present embodiment, since the fresh air inlet 15 is provided in the inclined surface, there is no such risk and smooth movement of the valve member 5 is secured. Although not particularly limited, an inclination angle of the inclined surface is preferably from 45 to 89 degrees, more preferably from 55 to 85 degrees, and even more preferably from 60 to 80 degrees.

As illustrated in FIG. 1(c), the flat region FR in the valve member mounting recess 7a is provided across a width W of 3 mm or more (preferably 3.5 mm, 4 mm, or more) surrounding the fresh air inlet 15. For example, when the fresh air inlet 15 is φ 4 mm and the fresh air inlet 15 is formed at the center of the flat region FR, the valve member mounting recess 7a is designed to be φ 10 mm or more. Although the upper limit of the width W of the flat region FR is not particularly defined, the width W is preferably not too large because a larger width W of the flat region FR causes the valve member mounting recess 7a to have a greater area, and as a result, the area of the gap between the outer shell 12 and the shrink film. The upper limit is, for example, 10 mm. Accordingly, the width W is, for example, from 3 to 10 mm. Specifically, it is, for example, 3, 3.5, 4, 4.5, 5, 6, 7, 8, 9, and 10 mm or it may be in a range between any two values exemplified here.

According to an experiment (Second Experimental Example) by the present inventors, it is found that a wider flat region FR on an outer surface side of the outer shell 12 causes a larger radius of curvature on an inner surface of the outer shell 12, and when the flat region FR is provided across the range of 3 mm or more surrounding the fresh air inlet 15 on the outer surface side of the outer shell, the radius of curvature on the inner surface of the outer shell 12 is sufficiently large, and as a result, the close adherence between the outer shell 12 and the valve member 5 is improved. The radius of curvature on the inner surface of the outer shell 12 is preferably 200 mm or more in a range of 2 mm surrounding the fresh air inlet 15 and even more preferably 250 mm or more or 300 mm or more. This is because, when the radius of curvature has such value, the inner surface of the outer shell 12 substantially becomes flat and the close adherence between the outer shell 12 and the valve member 5 is good.

Figure 6A:
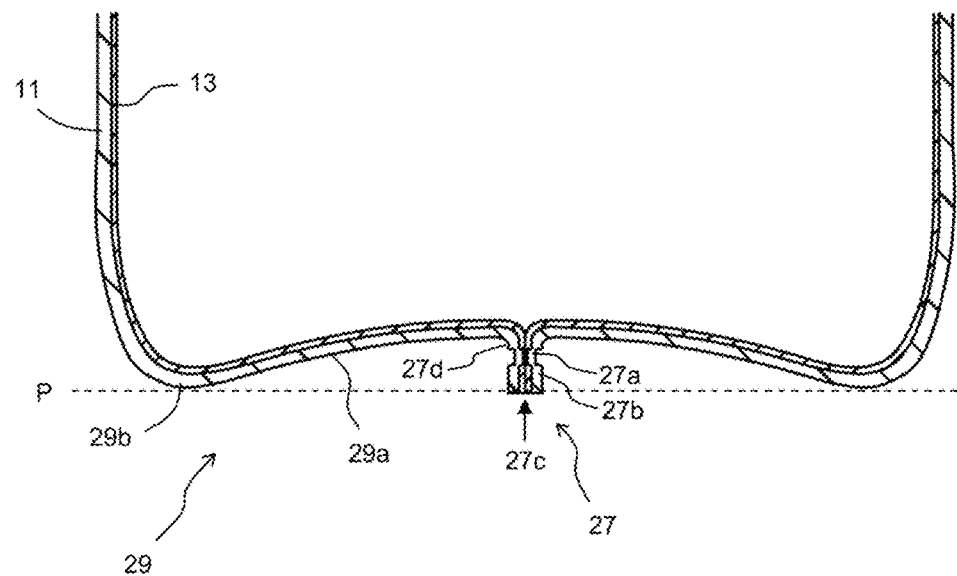
FIG. 6 are enlarged views of a region including a bottom surface 29 in FIG. 3, where (a) illustrates a state before bending the bottom seal protrusion 27 and (b) illustrates a state after bending the bottom seal protrusion 27.
Figure 6B:
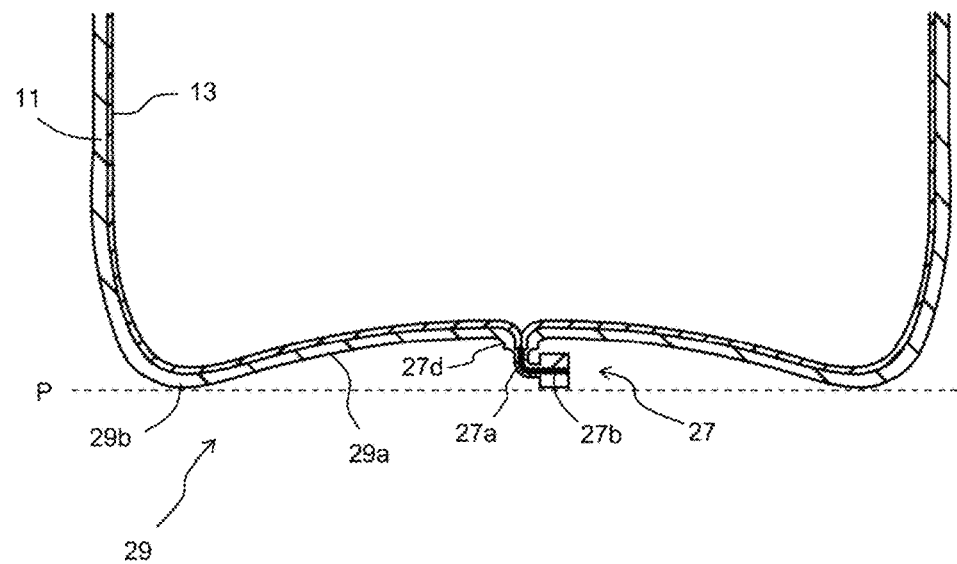
Figure 8:
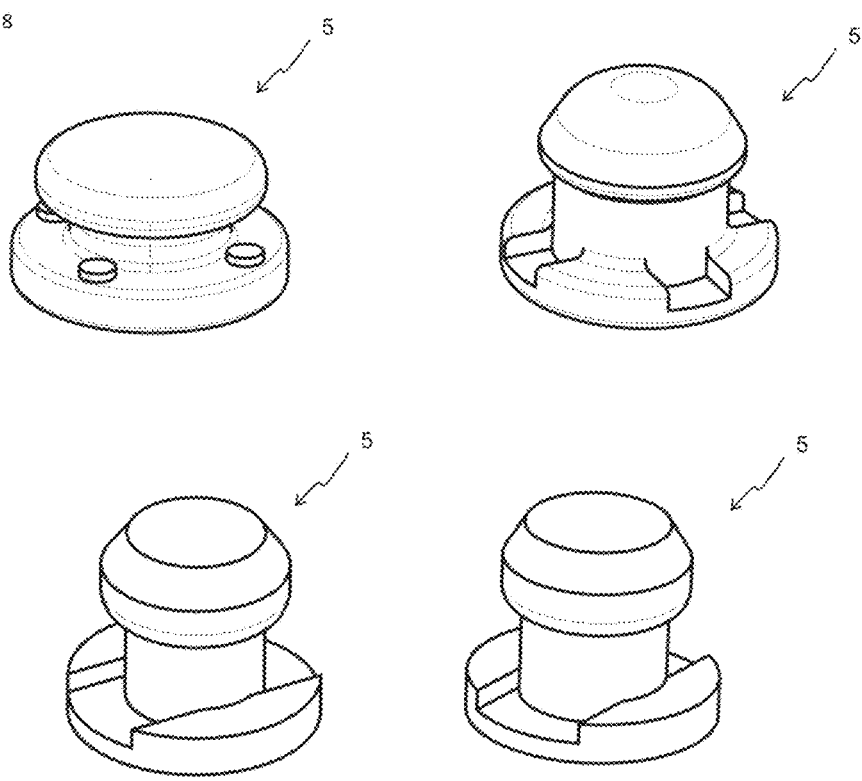
FIG. 8 is perspective views illustrating various structures of the valve member 5.

As illustrated in FIG. 1(b), the storage portion 7 has a bottom surface 29 equipped with a central concave region 29a and a peripheral region 29b surrounding the former region, and the central concave region 29a is provided with a bottom seal protrusion 27 protruding from the bottom surface 29. As illustrated in FIGS. 6(a) and 6(b), the bottom seal protrusion 27 is a sealing portion of a laminated parison in blow molding using a cylindrical laminated parison provided with the outer layer 11 and the inner layer 13. The bottom seal protrusion 27 is provided with, in order from the bottom surface 29 side, a base portion 27d, a thinner portion 27a, and a thicker portion 27b having a thickness greater than that of the thinner portion 27a.

Immediately after blow molding, as illustrated in FIG. 6(a), the bottom seal protrusion 27 is in a state of standing approximately vertically to a plane P defined by the peripheral region 29b. In this state, however, when impact is applied to the container, the inner layers 13 in a welded portion 27c are prone to be separated from each other and the impact resistance is insufficient. In the present embodiment, the thinner portion 27a is softened by blowing hot air on the bottom seal protrusion 27 after blow molding to bend the bottom seal protrusion 27, as illustrated in FIG. 6(b), in the thinner portion 27a. The impact resistance of the bottom seal protrusion 27 is thus improved simply by a simple procedure of bending the bottom seal protrusion 27. In addition, as illustrated in FIG. 6(b), the bottom seal protrusion 27 does not protrude from the plane P defined by the peripheral region 29b in a state of being bent. This prevents, when the delaminatable container 1 is stood, instability of the delaminatable container 1 due to the bottom seal protrusion 27 sticking out of the plane P.

The base portion 27d is provided on the bottom surface 29 side closer than the thinner portion 27a and is an area thicker than the thinner portion 27a. Although the base portion 27d does not have to be provided, the impact resistance of the bottom seal protrusion 27 is further improved by providing the thinner portion 27a on the base portion 27d.

As illustrated in FIG. 1(b), the concave region in the bottom surface 29 is provided across the entire bottom surface 29 in longitudinal directions of the bottom seal protrusion 27. That is, the central concave region 29a and the peripheral concave region 29c are connected. Such structure facilitates bending of the bottom seal protrusion 27.

The layer structure of the container body 3 is described below in further detail. The container body 3 is provided with the outer layer 11 and the inner layer 13.

The outer layer 11 is composed of, for example, low density polyethylene, linear low density polyethylene, high density polyethylene, polypropylene, an ethylene-propylene copolymer, a mixture thereof, and the like. The outer layer 11 may have a multilayer structure. For example, it may have a structure where a reproduction layer has both sides sandwiched by polypropylene layers. Here, the reproduction layer refers to a layer using burrs produced while molding a container by recycling. The outer layer 11 is formed thicker than the inner layer 13 for better restorability.

In the present embodiment, the outer layer 11 includes a random copolymer layer containing a random copolymer of propylene and another monomer. The outer layer 11 may be a single layer of the random copolymer layer or may be a multilayer structure. For example, it may have a structure where a reproduction layer has both sides sandwiched by random copolymer layers. The outer layer 11 is composed of a random copolymer of specific composition to improve shape restorability, transparency, and heat resistance of the outer shell 12.

The random copolymer has a content of a monomer other than propylene of less than 50 mol % and preferably from 5 to 35 mol %. Specifically, this content is, for example, 5, 10, 15, 20, 25, and 30 mol % or it may be in a range between any two values exemplified here. The monomer to be copolymerized with propylene may be one that improves impact resistance of the random copolymer compared with a homopolymer of polypropylene, and ethylene is particularly preferred. In the case of a random copolymer of propylene and ethylene, the ethylene content is preferably from 5 to 30 mol %. Specifically, it is, for example, 5, 10, 15, 20, 25, and 30 mol % or it may be in a range between any two values exemplified here. The random copolymer preferably has a weight average molecular weight from 100 thousands to 500 thousands, and even more preferably from 100 thousands to 300 thousands. Specifically, the weight average molecular weight is, for example, 100 thousands, 150 thousands, 200 thousands, 250 thousands, 300 thousands, 350 thousands, 400 thousands, 450 thousands, and 500 thousands or it may be in a range between any two values exemplified here.

The random copolymer has a tensile modulus of elasticity preferably from 400 to 1600 MPa and more preferably from 1000 to 1600 MPa. This is because the shape restorability is particularly good with a tensile modulus of elasticity in such range. Specifically, the tensile modulus of elasticity is, for example, 400, 500, 600, 700, 800, 900, 1000, 1100, 1200, 1300, 1400, 1500, and 1600 Mpa or it may be in a range between any two values exemplified here.

Since an excessively hard container impairs feeling of using the container, the outer layer 11 may be composed by, for example, mixing a softening material, such as linear low density polyethylene, to the random copolymer. Note that, in order not to severely interfere with effective properties of the random copolymer, the material to be mixed with the random copolymer is preferably mixed to be less than 50 weight % based on the entire mixture. For example, the outer layer 11 may be composed of a material in which the random copolymer is mixed with linear low density polyethylene at a weight ratio of 85:15.

As illustrated in FIG. 7(a), the inner layer 13 includes an EVOH layer 13a provided on a container outer surface side, an inner surface layer 13b provided on a container inner surface side of the EVOH layer 13a, and an adhesion layer 13c provided between the EVOH layer 13a and the inner surface layer 13b. By providing the EVOH layer 13a, it is possible to improve gas barrier properties and delamination properties from the outer layer 11.

The EVOH layer 13a is a layer containing an ethylene-vinyl alcohol copolymer (EVOH) resin and is obtained by hydrolysis of a copolymer of ethylene and vinyl acetate. The EVOH resin has an ethylene content, for example, from 25 to 50 mol %, and from the perspective of oxygen barrier properties, it is preferably 32 mol % or less. Although not particularly defined, the lower limit of the ethylene content is preferably 25 mol % or more because the flexibility of the EVOH layer 13a is prone to decrease when the ethylene content is less. The EVOH layer 13a preferably contains an oxygen absorbent. The content of an oxygen absorbent in the EVOH layer 13a further improves the oxygen barrier properties of the EVOH layer 13a. The EVOH resin preferably has a modulus of elasticity in bending of 2350 MPa or less and even more preferably 2250 MPa or less. Although not particularly defined, the lower limit of the modulus of elasticity in bending of the EVOH resin is, for example, 1800, 1900, or 2000 MPa. The modulus of elasticity in bending is measured in a test method in accordance with ISO 178. The testing speed is 2 mm/min.

The EVOH resin preferably has a melting point higher than the melting point of the random copolymer contained in the outer layer 11. The fresh air inlet 15 is preferably formed in the outer layer 11 using a thermal perforator, and when the fresh air inlet 15 is formed in the outer layer 11, the inlet is prevented from reaching the inner layer 13 by the EVOH resin having a melting point higher than the melting point of the random copolymer. From this perspective, a greater difference of (Melting Point of EVOH)−(Melting Point of Random Copolymer Layer) is desired, and it is preferably 15° C. or more and particularly preferably 30° C. or more. The difference in melting points is, for example, from 5 to 50° C. Specifically, it is, for example, 5, 10, 15, 20, 25, 30, 35, 40, 45, and 50° C. or it may be in a range between any two values exemplified here.

The inner surface layer 13b is a layer to make contact with the contents of the delaminatable container 1. It contains, for example, polyolefin, such as low density polyethylene, linear low density polyethylene, high density polyethylene, polypropylene, an ethylene-propylene copolymer, and a mixture thereof, and preferably low density polyethylene or linear low density polyethylene. The resin contained in the inner surface layer 13b preferably has a tensile modulus of elasticity from 50 to 300 MPa and more preferably from 70 to 200 MPa. This is because the inner surface layer 13b is particularly flexible when the tensile modulus of elasticity is in such range. Specifically, the tensile modulus of elasticity is, for example, specifically for example, 50, 100, 150, 200, 250, and 300 Mpa or it may be in a range between any two values exemplified here.

The adhesion layer 13c is a layer having a function of adhering the EVOH layer 13a to the inner surface layer 13b, and it is, for example, a product of adding acid modified polyolefin (e.g., maleic anhydride modified polyethylene) with carboxyl groups introduced therein to polyolefin described above or an ethylene-vinyl acetate copolymer (EVA). An example of the adhesion layer 13c is a mixture of acid modified polyethylene with low density polyethylene or linear low density polyethylene.

As illustrated in FIG. 7(b), the inner layer 13 may have a structure to include an internal EVOH layer 13d as an innermost layer, an external EVOH layer 13e as an outermost layer, and the adhesion layer 13c provided between them.

The internal EVOH layer 13d contains an ethylene-vinyl alcohol copolymer (EVOH) resin. According to an experiment (Fourth Experimental Example) by the present inventors, it is found that, when the innermost layer of the inner layer 13 is the internal EVOH layer 13d, adsorption or absorption of limonene in the container inner surface is inhibited, and as a result, the reduction of the citrus aroma emitted by a citrus-based liquid condiment is inhibited.

Since EVOH resins have relatively high rigidity, such EVOH resin is normally used by adding a softening agent to the EVOH resin for use as a material for the inner layer 13 to improve the flexibility. There is a risk, however, in adding a softening agent to the EVOH resin contained in the internal EVOH layer 13d as the innermost layer of the inner layer 13 of eluting the softening agent in the contents. Therefore, as the EVOH resin contained in the internal EVOH layer 13d, one that does not contain a softening agent has to be used. Meanwhile, since the EVOH resin not containing a softening agent has high rigidity, a problem occurs that, when the internal EVOH layer 13d is too thick, the inner bag 14 is not prone to be shrunk smoothly at delivery of the contents. When the internal EVOH layer 13d is too thin, the internal EVOH layer 13d is not formed uniformly and there are problems that the adhesion layer 13c is exposed to the container inner surface and a pinhole is prone to be formed in the internal EVOH layer 13d. From such perspective, the internal EVOH layer 13d preferably has a thickness from 10 to 20 µm.

The EVOH resin contained in the internal EVOH layer 13d has an ethylene content, for example, from 25 to 50 mol %. Since a greater ethylene content facilitates improvement in flexibility of the internal EVOH layer 13d, the ethylene content is preferably higher than that of the EVOH resin contained in the external EVOH layer 13e and it is preferred to be 35 mol % or more. In other words, the EVOH resin contained in the internal EVOH layer 13d preferably has an ethylene content set to have a tensile modulus of elasticity of the EVOH resin of 2000 MPa or less.

The external EVOH layer 13e also contains an ethylene-vinyl alcohol copolymer (EVOH) resin similar to the internal EVOH layer 13d. Note that, since the external EVOH layer 13e does not make contact with the contents, the flexibility may be increased by adding a softening agent, and for that purpose, the external EVOH layer 13e may have a thickness thicker than that of the internal EVOH layer. Although not particularly limited, the external EVOH layer 13e has a thickness, for example, from 20 to 30 µm. A problem occurs that the gas barrier properties of the inner layer 13 become insufficient when the external EVOH layer 13e is too thin, and another occurs that the flexibility of the inner layer 13 becomes insufficient when the external EVOH layer 13e is too thick, causing the inner bag 14 not prone to be shrunk smoothly at delivery of the contents. Although not particularly limited, a ratio of thicknesses of the external EVOH layer 13e/internal EVOH layer 13d is, for example, from 1.1 to 4 and preferably from 1.2 to 2.0. Specifically, the ratio is, for example, 1.1, 1.2, 1.3, 1.4, 1.5, 1.6, 1.7, 1.8, 1.9, 2, 2.1, 2.2, 2.3, 2.4, 2.5, 3, and 4 or it may be in a range between any two values exemplified here. By providing the external EVOH layer 13e as the outermost layer of the inner layer 13, it is possible to improve the delamination properties of the inner layer 13 from the outer layer 11.

The EVOH resin contained in the external EVOH layer 13e has an ethylene content, for example, from 25 to 50 mol %, and from the perspective of oxygen barrier properties, it is preferably 32 mol % or less. Although not particularly defined, the lower limit of the ethylene content is preferably 25 mol % or more because a less ethylene content causes a decrease in flexibility of the external EVOH layer 13e.

It is preferred that an amount of adding the softening agent to the EVOH resin contained in the external EVOH layer 13e and the ethylene content of the EVOH resin are set in such a manner that the EVOH resin has a tensile modulus of elasticity of 2000 MPa or less. Composition of both the internal EVOH layer 13d and the external EVOH layer 13e by EVOH resins having a tensile modulus of elasticity of 2000 MPa or less enables smooth shrinking of the inner bag 14. The external EVOH layer 13e preferably contains an oxygen absorbent. By containing an oxygen absorbent in the external EVOH layer 13e, it is possible to further improve the oxygen barrier properties of the external EVOH layer 13e.

The EVOH resin contained in the external EVOH layer 13e preferably has a melting point higher than the melting point of the random copolymer contained in the outer layer 11. The fresh air inlet 15 is preferably formed in the outer layer 11 using a thermal perforator, and when the fresh air inlet 15 is formed in the outer layer 11, the inlet is prevented from reaching the inner layer 13 by the EVOH resin having a melting point higher than the melting point of the random copolymer. From this perspective, a greater difference of (Melting Point of EVOH)−(Melting Point of Random Copolymer Layer) is desired, and it is preferably 15° C. or more and particularly preferably 30° C. or more. The difference in melting points is, for example, from 5 to 50° C. Specifically, it is, for example, 5, 10, 15, 20, 25, 30, 35, 40, 45, and 50° C. or it may be in a range between any two values exemplified here.

The adhesion layer 13c is a layer arranged between the internal EVOH layer 13d and the external EVOH layer 13e, and it is, for example, a product of adding acid modified polyolefin (e.g., maleic anhydride modified polyethylene) with carboxyl groups introduced therein to polyolefin described above or an ethylene-vinyl acetate copolymer (EVA). An example of the adhesion layer 13c is a mixture of acid modified polyethylene with low density polyethylene or linear low density polyethylene. The adhesion layer 13c may directly adhere the internal EVOH layer 13d to the external EVOH layer 13e or may indirectly adhere via another layer provided between the adhesion layer 13c and the internal EVOH layer 13d or between the adhesion layer 13c and the external EVOH layer 13e.

The adhesion layer 13c is a layer having rigidity per unit thickness less than that of any of the internal EVOH layer 13d and the external EVOH layer 13e, that is, a layer excellent in flexibility. Therefore, by thickening the adhesion layer 13c to increase the ratio of the thickness of the adhesion layer 13c to the thickness of the entire inner layer 13, the flexibility of the inner layer 13 is increased and the inner bag 14 readily shrinks smoothly at delivery of the contents. Specifically, the adhesion layer 13c preferably has a thickness greater than a total of the thickness of the internal EVOH layer 13d and the thickness of the external EVOH layer 13e. The ratio of thicknesses of Adhesion Layer 13c/(Internal EVOH Layer 13d+External EVOH Layer 13e) is, for example, from 1.1 to 8. Specifically, the ratio is, for example, 1.1, 1.5, 2, 2.5, 3, 3.5, 4, 4.5, 5, 5.5, 6, 7, and 8 or it may be in a range between any two values exemplified here.

Then, an example of a method of manufacturing the delaminatable container 1 in the present embodiment is described.

Firstly, as illustrated in FIG. 9(a) a laminated parison in a melted state with a laminated structure (in an example, as illustrated in FIG. 9(a), a laminated structure of PE layer/adhesion layer/EVOH layer/PP layer in order from the container inner surface side) corresponding to the container body 3 to be manufactured is extruded to set the laminated parison in the melted state in a blow molding die and the split die is closed.

Then, as illustrated in FIG. 9(b), a blowing nozzle is inserted into an opening of the mouth 9 of the container body 3 to blow air into a cavity of the split die in the mold closing state.

Then, as illustrated in FIG. 9(c), the split die is opened to take out a blow molded article. The split die has a cavity shape to form various shapes of the container body 3, such as the valve member mounting recess 7a, the air circulation groove 7b, and the bottom seal protrusion 27, in the blow molded article. The split die is provided with a pinch-off below the bottom seal protrusion 27. Lower burrs are thus formed in the area below the bottom seal protrusion 27 and they are removed.

Then, as illustrated in FIG. 9(d), blow molded articles thus taken out are aligned.

Then, as illustrated in FIG. 9(e), a hole is made only in the outer layer 11 in an upper tubular portion 31 provided above the mouth 9 to blow air between the outer layer 11 and the inner layer 13 using a blower 33 for preliminary delamination of the inner layer 13 from the outer layer 11 in a portion, of the storage portion 7, to mount the valve member 5 (valve member mounting recess 7a). The preliminary delamination facilitates a procedure to form the fresh air inlet 15 and a procedure to mount the valve member 5. To prevent leakage of the blown air from the end side of the upper tubular portion 31, the end side of the upper tubular portion 31 may be covered with a cover member. In order to facilitate making a hole only in the outer layer 11, the inner layer 13 may delaminate from the outer layer 11 in the upper tubular portion 31 by squashing the upper tubular portion 31 before making a hole. The preliminary delamination may be applied to the entire storage portion 7 or to part of the storage portion 7.

Then, as illustrated in FIG. 9(f), the fresh air inlet 15 is formed in the outer shell 12 using a boring tool. The fresh air inlet is preferably a circular hole while it may be in another shape.

The procedures of inner layer preliminary delamination and fresh air inlet opening may be in the following method.

Firstly, as illustrated in FIG. 10(a), the air in the inner bag 14 is sucked from the mouth 9 to reduce the pressure in the inner bag 14. In this state, a perforator, such as a heat pipe or a pipe cutter, is gradually pressed against the outer layer 11. The perforator has a tubular cutter and the air inside the tube is sucked. In a state where a hole is not made in the outer layer 11, no air enters between the outer layer 11 and the inner layer 13 and thus the inner layer 13 does not delaminate from the outer layer 11.

When the tubular cutter penetrates the outer layer 11, as illustrated in FIG. 10(b), the cut piece that is hollowed out is removed through the tubular cutter and the fresh air inlet 15 is formed. At this moment, air enters between the outer layer 11 and the inner layer 13 and the inner layer 13 delaminates from the outer layer 11.

Then, as illustrated in FIGS. 10(c) and 10(d), the diameter of the fresh air inlet 15 is enlarged using a boring tool. When the fresh air inlet 15 in a size sufficient for insertion of the valve member 5 is formed in the procedures in FIGS. 10(a) and 10(b), the diameter enlargement procedure in FIGS. 10(c) and 10(d) are not required.

The procedures of inner layer preliminary delamination and fresh air inlet opening may be in the following method. Here, with reference to FIGS. 11(a) through 11(f), a method is described in which the fresh air inlet 15 is formed in the outer shell 12 of the delaminatable container 1 using a thermal perforator 2, followed by preliminary delamination.

Firstly, as illustrated in FIG. 11(a), the delaminatable container 1 is set in a position in proximity to the perforator 2. The perforator 2 is provided with a tubular cutter blade 2a, a motor 2c to rotationally drive the cutter blade 2a through a transmission belt 2b, and a heating device 2d to heat the cutter blade 2a. The perforator 2 is supported by a servo cylinder (not shown) to single-axis move the perforator 2 by rotation of a servo motor and is configured movably in an arrow X1 direction in FIG. 11(c) and in an arrow X2 direction in FIG. 11(e). Such structure enables rotation of the heated cutter blade 2a while pressing the edge against the outer shell 12 of the delaminatable container 1. The control of the position and the moving speed of the perforator 2 by the servo motor enables reduction in tact time.

The cutter blade 2a is coupled to a ventilation pipe 2e in communication with a hollow in the cutter blade 2a, and the ventilation pipe 2e is coupled to an air intake and exhaust system, not shown. This enables air suction from inside the cutter blade 2a and air blowing inside the cutter blade 2a. The heating device 2d is provided with a coil 2f formed of a conductive wire and configured to heat the cutter blade 2a by the principle of electromagnetic induction by applying an alternating current to the coil 2f. The heating device 2d is arranged in proximity to a blow molded article 1a and separate from the cutter blade 2a. Such structure simplifies wiring of the heating device 2d and enables efficient heating of the edge of the cutter blade 2a.

Then, as illustrated in FIG. 11(b), the perforator 2 is brought close to the delaminatable container 1 for penetration of the cutter blade 2a into the coil 2f. By applying an alternating current to the coil 2f in this state, the cutter blade 2a is heated.

Then, as illustrated in FIG. 11(c), the perforator 2 is moved at high speed in the arrow X1 direction to the position where the edge of the cutter blade 2a reaches immediately in front of the delaminatable container 1.

Then, as illustrated in FIG. 11(d), while a suction force is exerted on the edge of the cutter blade 2a by sucking air inside the cutter blade 2a, the perforator 2 is brought close to the delaminatable container 1 at very slow speed for penetration of the edge of the cutter blade 2a into the outer shell 12 of the delaminatable container 1. Such combination of high speed movement and very slow speed movement enables reduction in tact time. Although the entire perforator 2 is moved in the present embodiment, another embodiment may apply where only the cutter blade 2a is moved by a cylinder mechanism or the like and the cutter blade 2a is moved at high speed to the position where the edge of the cutter blade 2a reaches immediately in front of the delaminatable container 1 and the cutter blade 2a is moved at very slow speed for penetration of the cutter blade 2a into the outer shell 12.

Figure 12A:
FIG. 12 are cross-sectional views illustrating the shape of tubular cutter blade edges, where (a) illustrates the shape of a sharp edge and (b) illustrates the shape of a rounded edge.
Figure 12B:

When the edge of the cutter blade 2a reaches the boundary between the outer shell 12 and the inner bag 14, the outer shell 12 is hollowed out in the shape of the edge of the cutter blade 2a to form the fresh air inlet 15. A cut piece 15a that is hollowed out of the outer shell 12 is sucked in the hollow of the cutter blade 2a. The cutter blade 2a may stop the movement when the edge reaches the boundary between the outer shell 12 and the inner bag 14, whereas it may be moved until the edge of the cutter blade 2a is pressed against the inner bag 14 beyond the interface between the outer shell 12 and the inner bag 14 to form the fresh air inlet 15 more securely. At this point, to inhibit damage in the inner bag 14 by the cutter blade 2a, the shape of the edge of the cutter blade 2a is preferably a rounded shape as illustrated in FIG. 12(b) to a sharp shape as illustrated in FIG. 12(a). Although the fresh air inlet 15 is not easily formed in the outer shell 12 with a rounded edge of the cutter blade 2a, the present embodiment enables easy formation of the fresh air inlet 15 in the outer shell 12 by rotating the heated cutter blade 2a. Not to melt the inner bag 14 by the heat of the cutter blade 2a, the resin contained in the outermost layer of the inner bag 14 preferably has a melting point higher than the melting point of the resin contained in the innermost layer of the outer shell 12.

Then, as illustrated in FIG. 11(e), the perforator 2 is set back in the arrow X2 direction to blow air into the hollow of the cutter blade 2a, thereby emitting the cut piece 15a from the edge of the cutter blade 2a.

In the above procedures, formation of the fresh air inlet 15 in the outer shell 12 is completed.

Then, as illustrated in FIG. 11(f), air is blown between the outer shell 12 and the inner bag 14 through the fresh air inlet 15 using the blower 33 for preliminary delamination of the inner bag 14 from the outer shell 12. By blowing air in a defined amount while avoiding air leakage through the fresh air inlet 15, preliminary delamination of the inner bag 14 is readily controlled. Although the preliminary delamination may be applied to the entire storage portion 7 or may be applied to part of the storage portion 7, it is preferred that preliminary delamination of the inner bag 14 from the outer shell 12 in approximately the entire storage portion 7 because it is not possible to check the presence of a pinhole in the inner bag 14 in a portion not subjected to preliminary delamination.

Then, as illustrated in FIG. 13(a), the thinner portion 27a is softened by exposing the bottom seal protrusion 27 to hot air to bend the bottom seal protrusion 27.

Then, as illustrated in FIG. 13(b), the inner bag 14 is checked for a pinhole. Specifically, firstly, an adapter 35 is mounted to the mouth 9 and an inspection gas containing a specific type of gas is injected in the inner bag 14 through the mouth 9. When a pinhole is present in the inner bag 14, the specific type of gas leaks to the intermediate space 21 through the pinhole and is discharged outside the container through the fresh air inlet 15 from the intermediate space 21. Outside the container, in a position in proximity to the fresh air inlet 15, a sensor (detector) 37 for the specific type of gas is arranged, which enables sensing of leakage of the specific type of gas. When the concentration of the specific type of gas sensed by the sensor 37 is at a threshold or less, determination is made that a pinhole is not present in the inner bag 14 and the delaminatable container 1 is determined as a good product. In contrast, when the concentration of the specific type of gas sensed by the sensor 37 exceeds the threshold, determination is made that a pinhole is present in the inner bag 14 and the delaminatable container 1 is determined as a defective product. The delaminatable container 1 determined as a defective product is removed from the production line.

As the specific type of gas, a type of gas present in a less amount in the air (preferably a type of gas at 1% or less) is selected preferably and examples of it may include hydrogen, carbon dioxide, helium, argon, neon, and the like. The concentration of the specific type of gas in the inspection gas is not particularly limited, and the inspection gas may be composed only of the specific type of gas or may be a mixed gas of air and the specific type of gas.

Although not particularly limited, the injection pressure of the inspection gas is, for example, from 1.5 to 4.0 kPa. When the injection pressure is too low, the leakage of the specific type of gas is sometimes too little to sense the specific type of gas even though a pinhole is present. When the injection pressure is too high, the inner bag 14 expands and is pressed against the outer shell 12 immediately after injection of the inspection gas, resulting in a decrease in accuracy of check for a pinhole of the inner bag 14.

Although the sensor 37 is arranged outside the delaminatable container 1 in proximity to the fresh air inlet 15 in the present embodiment, the sensor 37 may be inserted into the intermediate space 21 through the fresh air inlet 15 to detect the specific type of gas in the intermediate space 21 as a modification. In this case, it is possible to sense the specific type of gas before diffusion of the specific type of gas passing through a pinhole in the inner bag 14, and thus the accuracy of sensing the specific type of gas is improved. As still another modification, the inspection gas containing the specific type of gas may be injected in the intermediate space 21 from the fresh air inlet 15 to sense the specific type of gas leaked to the inner bag 14 through a pinhole in the inner bag 14. In this case, the sensor 37 may be arranged outside the container in a position in proximity to the mouth 9 or the sensor 37 may be inserted into the inner bag 14 from the mouth 9.

The delaminatable container 1 after checked for a pinhole may be forwarded directly to a next procedure, whereas in a modification it may be forwarded to a next procedure after a procedure of expanding the inner bag 14 by blowing air into the inner bag 14. In the case of the latter, an air blowing procedure in FIG. 13(e) may be omitted.

Then, as illustrated in FIG. 13(c), the valve member 5 is inserted into the fresh air inlet 15.

Then, as illustrated in FIG. 13(d), the upper tubular portion 31 is cut.

Then, as illustrated in FIG. 13(e), the inner bag 14 is expanded by blowing air into the inner bag 14.

Then, as illustrated in FIG. 13(f), the inner bag 14 is filled with the contents.

Then, as illustrated in FIG. 13(g), the cap 23 is mounted on the mouth 9.

Then, as illustrated in FIG. 13(h), the storage portion 7 is covered with a shrink film to complete the product.

The order of various procedures described here may be switched appropriately. For example, the hot air bending procedure may be before the fresh air inlet opening procedure or may be before the inner layer preliminary delamination procedure. The procedure of cutting the upper tubular portion 31 may be before inserting the valve member 5 into the fresh air inlet 15.

Then, working principle of the product thus manufactured in use is described.

As illustrated in FIGS. 14(a) through 14(c), in a state where the product filled with the contents, a side of the outer shell 12 is squeezed for compression to deliver the contents.

At the start of use, there is substantially no gap between the inner bag 14 and the outer shell 12, and thus the compressive force applied to the outer shell 12 directly becomes a compressive force to the inner bag 14 and the inner bag 14 is compressed to deliver the contents.

The cap 23 has a built-in check valve, not shown, so that it is capable of delivering the contents in the inner bag 14 but not capable of taking fresh air in the inner bag 14. Therefore, when the compressive force applied to the outer shell 12 is removed after delivery of the contents, the outer shell 12 attempts to be back in the original shape by the restoring force of itself but the inner bag 14 remains deflated and only the outer shell 12 expands. Then, as illustrated in FIG. 14(d), inside the intermediate space 21 between the inner bag 14 and the outer shell 12 is in a reduced pressure state to introduce fresh air in the intermediate space 21 through the fresh air inlet 15 formed in the outer shell 12. When the intermediate space 21 is in a reduced pressure state, the lid 5c is not pressed against the fresh air inlet 15 and thus it does not interfere with introduction of fresh air. Not to cause the locking portion 5b to interfere with introduction of fresh air even in a state where the locking portion 5b makes contact with the outer shell 12, the locking portion 5b is provided with an air passage securing mechanism, such as the projections 5d and grooves.

Then, as illustrated in FIG. 14(e), when the side of the outer shell 12 is again squeezed for compression, the lid 5c closes the fresh air inlet 15 to increase the pressure in the intermediate space 21, and the compressive force applied to the outer shell 12 is transmitted to the inner bag 14 via the intermediate space 21 and the inner bag 14 is compressed by this force to deliver the contents.

Then, as illustrated in FIG. 14(f), when the compressive force applied to the outer shell 12 is removed after delivery of the contents, the outer shell 12 is restored in the original shape by the restoring force of itself while fresh air is introduced in the intermediate space 21 from the fresh air inlet 15.

2. Second Embodiment

Figure 15A:
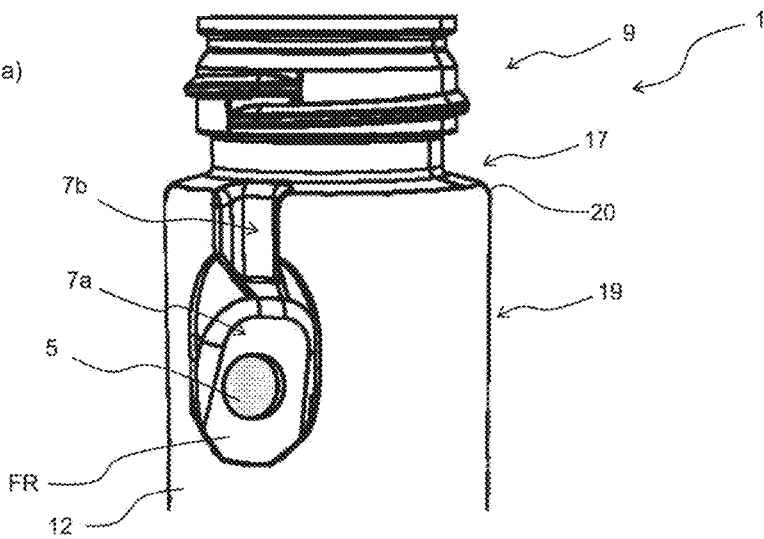
FIG. 15 illustrate a structure of a delaminatable container 1 in a second embodiment of the present invention, where (a) is a perspective view, (b) is an enlarged view of and around a valve member mounting recess 7a, and (c) is an A-A cross-sectional view in FIG. 15(b). Figs. (b) and (c) illustrate a state of removing a valve member 5.
Figure 15B:
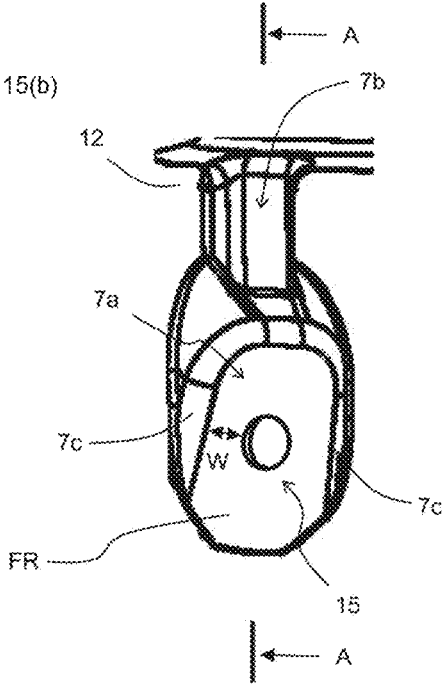

Then, with reference to FIG. 15, a delaminatable container 1 in a second embodiment of the present invention is described. The delaminatable container 1 in the present embodiment has the layer structure and the functions same as those in the first embodiment, whereas it is different in a specific shape. The delaminatable container 1 in the present embodiment is particularly different in the configuration of and around a valve member mounting recess 7a from the first embodiment, and thus the descriptions are given below mainly on this point.

As illustrated in FIG. 15(a), the delaminatable container 1 in the present embodiment is structured by coupling a mouth 9 to a main portion 19 by a shoulder portion 17. While the bent portion 22 is provided in the shoulder portion 17 in the first embodiment, the shoulder portion 17 is not provided with a bent portion 22 in the present embodiment and the boundary between the shoulder portion 17 and the main portion 19 functions in the same manner as the bent portion 22 to inhibit delamination of an inner bag 14 from reaching the mouth 9.

Figure 15C:
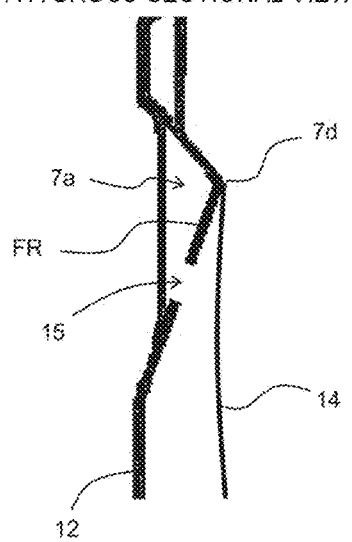
Figure 16A:
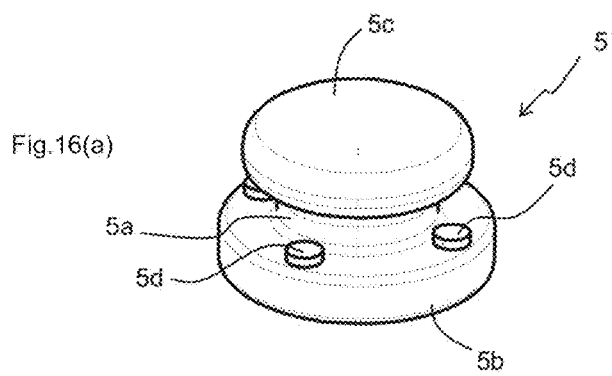
FIG. 16 illustrate a first structural example of the valve member 5, where (a) is a perspective view and (b) is a front view.
Figure 16B:
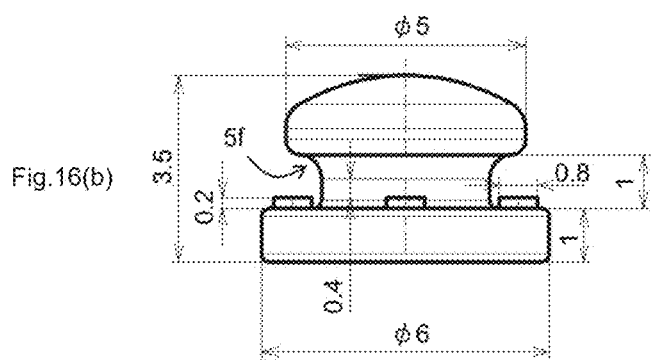
Figure 17A:
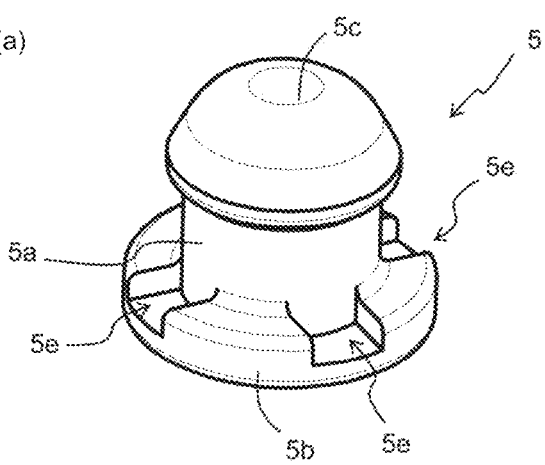
FIG. 17 illustrate a second structural example of the valve member 5, where (a) is a perspective view and (b) is a front view.
Figure 17B:
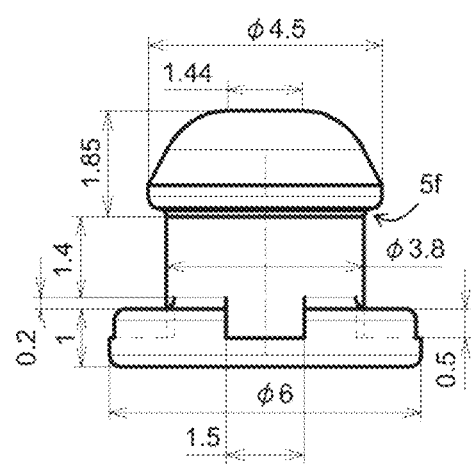
Figure 18A:
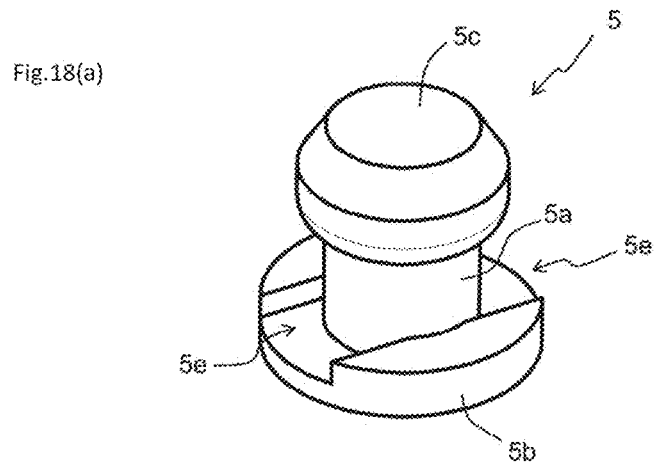
FIG. 18 illustrate a third structural example of the valve member 5, where (a) is a perspective view and (b) is a front view.
Figure 18B:
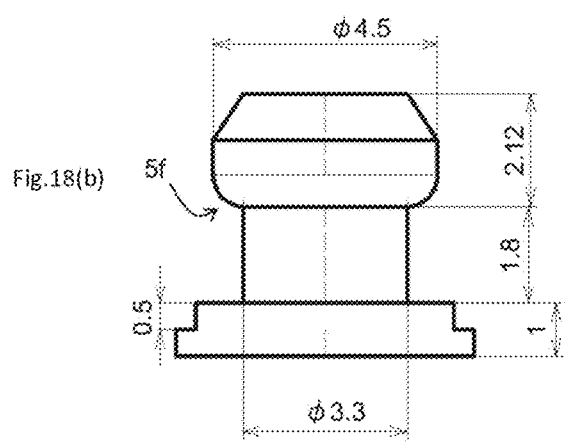
Figure 19A:
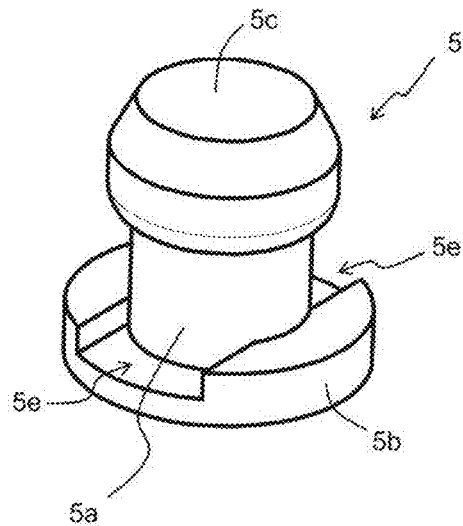
FIG. 19 illustrate a fourth structural example of the valve member 5, where (a) is a perspective view and (b) is a front view.
Figure 19B:
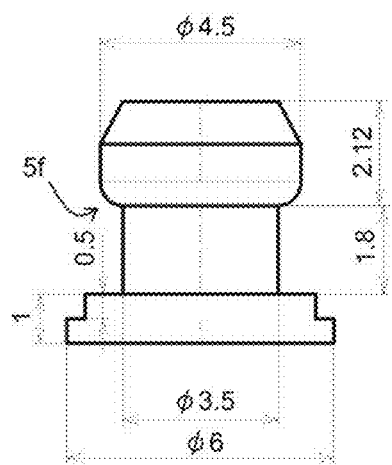

The valve member mounting recess 7a is provided in the main portion 19 composed of an approximately vertical wall, and the valve member mounting recess 7a is equipped with a flat region FR. The flat region FR is an inclined surface at approximately 70 degrees. The flat region FR is provided with a fresh air inlet 15, and a width W of the flat region FR surrounding the fresh air inlet 15 is 3 mm or more same as in the first embodiment. The valve member mounting recess 7a has side walls 7c of tapered surfaces extending toward outside to facilitate a die to form the valve member mounting recess 7a to be taken away. As illustrated in FIG. 15(c), the inner bag 14 starts from an upper edge 7d of the flat region FR for ease of delamination.

3. Third Embodiment

Then, with reference to FIG. 21, a delaminatable container 1 in a third embodiment of the present invention is described. The delaminatable container 1 in the present embodiment has the layer structure and the functions same as those in the first and second embodiments, whereas it is different in the structure of a valve member 5.

Specifically, the valve member 5 in the present embodiment has a locking portion 5b provided with a pair of foundation portions 5b1 and a bridge portion 5b2 disposed between the foundation portions 5b1. An axis 5a is provided on the bridge portion 5b2.

The lid 5c is configured to substantially close the fresh air inlet 15 when the outer shell 12 is compressed and is provided with a tapered surface 5d to have a smaller cross-sectional area as coming closer to the axis 5a. An inclination angle β of the tapered surface 5d illustrated in FIG. 21(c) is preferably from 15 to 45 degrees to a direction D in which the axis 5a extends and even more preferably from 20 to 35 degrees. This is because air leakage is prone to occur when the inclination angle β is too large and the valve member 5 becomes long when too small.

As illustrated in FIG. 21(d), the locking portion 5b is configured, in a state of mounted to the fresh air inlet 15, in such a manner that the foundation portions 5b1 has abutment surfaces 5e to abut on the outer shell 12 and the bridge portion 5b2 deflects. According to such structure, a restoring force is generated in the bridge portion 5b2 in a direction separating from the container as illustrated by an arrow FO, thereby exerting a biasing force in the same direction on the lid 5c to press the lid 5c against the outer shell 12.

In this state, the lid 5c is only lightly pressed against the outer shell 12. However, when the outer shell 12 is compressed, the pressure in the intermediate space 21 becomes higher than external pressure and the pressure difference causes the lid 5c to be even stronger pressed against the fresh air inlet 15 to close the fresh air inlet 15 by the lid 5c. Since the lid 5c is equipped with the tapered surface 5d, the lid 5c readily fits into the fresh air inlet 15 to close the fresh air inlet 15.

When the outer shell 12 is further compressed in this state, the pressure in the intermediate space 21 is increased, and as a result, the inner bag 14 is compressed to deliver the contents in the inner bag 14. When the compressive force to the outer shell 12 is released, the outer shell 12 attempts to restore its shape by the elasticity of its own. The pressure in the intermediate space 21 is reduced with the restoration of the outer shell 12, thereby applying a force FI, as illustrated in FIG. 21(e), in a direction inside the container to the lid 5c. This increases the deflection of the bridge portion 5b2 and forms a gap Z between the lid 5c and the outer shell 12 to introduce fresh air in the intermediate space 21 through a path 5f between the bridge portion 5b2 and the outer shell 12, the fresh air inlet 15, and the gap Z.

The valve member 5 in the present embodiment can be molded by injection molding or the like using a split die of a simple configuration that splits in an arrow X direction along a parting line L illustrated in FIG. 21(a) and thus is excellent in productivity.

EXAMPLES

1. First Experimental Example

In the experimental example below, a delaminatable container having the outer layer 11 and the inner layer 13 was produced by blow molding, and the fresh air inlet 15 of φ 4 mm was formed only in the outer layer 11 having a thickness of 0.7 mm using a thermal perforator. In addition, valve members 5 of first through fifth structural examples illustrated in FIGS. 16 through 20 and indicated in Table 1 were manufactured by injection molding, and the lid 5c of such valve member 5 was pressed into the intermediate space 21 through the fresh air inlet 15.

The valve members 5 in the first through fifth structural examples were evaluated in operability, moldability, tilt resistance, and transferability. The results are indicated in Table 1 below. The symbols X, Δ, and O in each evaluation point in Table 1 are relative evaluation results, where Δ denotes an evaluation result better than X and O denotes an evaluation result better than Δ.

TABLE 1

|  |  | Structural Examples | | | | |
|---|---|---|---|---|---|---|
|  |  | 1 | 2 | 3 | 4 | 5 |
| Lid | Diameter (mm) | 5 | 4.5 | 4.5 | 4.5 | 4.5 |
|  | Shape of Boundary between Lid and Axis | Depressed Curve | Depressed Curve | Bulged Curve | Bulged Curve | Bulged Curve |
| Axis | Diameter (mm) | 3.8 | 3.8 | 3.3 | 3.5 | 3.5 |
|  | Length (mm) | 0.4 | 1.4 | 1.8 | 1.8 | 1.8 |
| Locking Portion | Shape of Surface on Axis side | Four Button-Like Projections | Four Grooves | Two Grooves | Two Grooves | Two Grooves |
|  | Diameter (mm) | 6 | 6 | 6 | 6 | 7 |
|  | Thickness (mm) | 1 | 1 | 1 | 1 | 1.5 |
|  | Slidable Length (mm) | 0 | 0.7 | 1.1 | 1.1 | 1.1 |
|  | Clearance to Fresh Air Inlet (mm) | 0.2 | 0.2 | 0.7 | 0.5 | 0.5 |
|  | Amount of Sticking out Locking Portion (mm) | 1 | 1.5 | 1.5 | 1.5 | 2.5 |
| Evaluation | Operability | X | Δ | O | O | O |
|  | Moldability | Δ | Δ | O | O | O |
|  | Tilt Resistance | X | X | Δ | O | O |
|  | Transferability | Δ | Δ | Δ | Δ | O |

The operability is evaluation of whether or not the fresh air inlet 15 is smoothly opened and closed by the valve member 5. In the first structural example where the axis 5a has a length shorter than a thickness of the outer layer 11, a slidable length was 0 and the fresh air inlet 15 remained closed. In the second structural example, although the fresh air inlet 15 was opened and closed by the valve member 5, the operation was sometimes not smooth. In contrast, in the third through fifth structural examples, the fresh air inlet 15 was smoothly opened and closed by the valve member 5. The reasons why the valve member 5 did not operate smoothly in the second structural example may include that the slidable length (length of axis 5a-thickness of outer layer 11) was 0.7 mm, which was not a sufficient length, and that the clearance to the fresh air inlet 15 (diameter of fresh air inlet 15–diameter of axis 5a) was 0.2 mm, which was not a sufficient size. In contrast, in the third through fifth structural examples, the slidable length was 1 mm or more, which was a sufficient length, and the clearance to the fresh air inlet 15 was 0.3 mm or more, which was a sufficient size, so that the valve member 5 operated smoothly. When the slidable length exceeds 2 mm, the valve member 5 is prone to interfere with the shrink film and the inner layer 13, and thus the valve member 5 preferably has a slidable length from 1 to 2 mm.

The moldability is evaluation of ease of molding the valve member 5 by injection molding. When the surface of the locking portion 5b on the axis 5a side was provided with the projections 5d as in the first structural example or four grooves 5e circumferentially at regular intervals as in the second structural example, the valve member 5 after molding had to be forcibly taken out of the split die or a split die with a special configuration had to be prepared, so that the moldability was poor. In contrast, when two grooves 5e were provided circumferentially at regular intervals as in the third through fifth structural examples, the valve member 5 was readily taken out of the split die and the moldability was excellent.

The tilt resistance is evaluation of whether or not a gap is prone to be formed in the fresh air inlet 15 when the valve member 5 is tilted in a state where the lid 5c is pressed against the fresh air inlet 15. When the shape at a boundary 5f between the lid 5c and the axis 5a was a curved shape depressing inside as in the first and second structural examples, a gap was prone to be formed in the fresh air inlet 15 when the valve member 5 was tilted. In contrast, when the shape of the boundary 5f between the lid 5c and the axis 5a was a curved shape bulged outside as in the third through fifth structural examples, a gap was not prone to be formed in the fresh air inlet 15 when the valve member 5 was tilted. In the third structural example, the clearance to the fresh air inlet 15 was 0.7 mm, which is too large, and the valve member 5 was tilted considerably and thus a gap was relatively prone to be formed. In contrast, in the fourth and fifth structural examples, the clearance to the fresh air inlet 15 was 0.6 mm or less, which was an adequate size, and an excessive tilt of the valve member 5 was inhibited. Considering both the operability and the tilt resistance, the clearance to the fresh air inlet 15 is preferably from 0.2 to 0.7 mm and even more preferably from 0.3 to 0.6 mm.

The transferability is evaluation of whether or not a large number of valve members 5 are readily transferred using a part feeder to hold the valve members 5 on two parallel rails at an interval slightly greater than the diameter of the lid 5c. The valve members 5 were inserted between the two rails with the lid 5c downward and held on the parallel rails by being caught on the parallel rails at the locking portion 5b. The transferability is further classified into anti-overlap properties and anti-fall properties.

The anti-overlap properties are evaluation of probability of not overlapping the locking portions 5b of the valve member 5 with each other. In the first through fourth structural examples, the locking portion 5b had a thickness of 1 mm, which was not a sufficient thickness, and thus the locking portions 5b were prone to be overlapped with each other. In contrast, in the fifth structural example, the locking portion 5b had a thickness of not less than 1.2 mm, which was a sufficient thickness, and the locking portions 5b were not prone to be overlapped with each other.

The anti-fall properties are evaluation of whether or not the valve members 5 are appropriately held on the parallel rails without being dislocated and falling out of the parallel rails. In the first through fourth structural examples, the amount of the locking portion 5b sticking out (diameter of locking portion 5b–diameter of lid 5c) was 1.5 mm or less, which was too small, and the valve members 5 were prone to fall out of the parallel rails. In contrast, in the fifth structural example, the amount of the locking portion 5b sticking out was not less than 2 mm, and the valve members 5 did not fall out of the parallel rails and readily transferred using the parallel rails.

The valve member 5 in the fifth structural example, as illustrated in FIG. 20(c), was equipped with a recess 5g in the outer surface of the locking portion 5b. When the valve member 5 is injection molded, burrs are formed in the position of an injection gate. By designing the position of the injection gate in the recess 5g, it is possible to avoid the burrs interfering with the shrink film.

2. Second Experimental Example

In the experimental example below, a delaminatable container having the outer layer 11 and the inner layer 13 was produced by blow molding and the fresh air inlet 15 was formed only in the outer layer 11 having a thickness of 0.7 mm using a thermal perforator. By variously changing an inner capacity of the delaminatable container, a size of the fresh air inlet 15, and the width W surrounding the fresh air inlet 15 in the flat region FR in the valve member mounting recess 7a, delaminatable containers of sample No. 1 through 5 were formed. In addition, the valve member 5 in the shape illustrated in FIG. 20 was produced by injection molding and the lid 5c of the valve member 5 was pressed into the intermediate space 21 through the fresh air inlet 15. The delaminatable container 1 thus obtained was filled with the contents (water), followed by pressing a side of the delaminatable container to deliver the contents from the delaminatable container. Delivery performance when the contents at 80% of the inner capacity were delivered (delivery performance for a small amount of the contents) was evaluated. The evaluation was made as "O" for delivery of the contents with no trouble and as "X" for uneasy delivery of the contents. The results are indicated in Table 2.

TABLE 2

|  | Sample No. | | | | |
| --- | --- | --- | --- | --- | --- |
|  | 1 | 2 | 3 | 4 | 5 |
| Inner Capacity (ml) | 200 | 200 | 200 | 200 | 500 |
| Diameter of Fresh Air Inlet | 4.0 | 3.8 | 3.7 | 3.7 | 4.0 |
| Width W of Flat Region FR | 2.0 | 2.1 | 2.2 | 4.2 | 4.0 |
| Delivery Performance For Small Amount of Contents | X | X | X | O | O |
| Radius of Curvature on Outer Shell Inner Surface (mm) | 30 | 30 | 30 | 300 | 750 |

As indicated in Table 2, samples No. 1 through 3 had low delivery performance for a small amount of the contents and samples No. 1 through 5 had high delivery performance for a small amount of the contents. To review reasons of such results, each sample was measured on a radius of curvature on the inner surface of the outer shell 12 in a range of 2 mm surrounding the fresh air inlet 15, and the results indicated in Table 2 were obtained. As indicated in Table 2, when the width W of the flat region FR on the outer surface of the outer shell 12 was 3 mm or more, it was found that the radius of curvature on the inner surface of the outer shell 12 became severely large and the inner surface of the outer shell 12 became approximately flat. In contrast, when the width W of the flat region FR on the outer surface of the outer shell 12 was less than 3 mm, it was found that the inner surface of the outer shell 12 did not become flat but curved. Then, it was found that the delivery performance for a small amount of the contents was lowered by air leakage from the fresh air inlet 15 because of the curved surface did not appropriately match the valve member 5.

3. Third Experimental Example

In the experimental example below, various delaminatable containers having different layer structures were produced by blow molding for various types of evaluation, such as restorability, rigidity, impact resistance, heat resistance, transparency, gas barrier properties, moldability, and outer layer processability. The outer layer processability indicates ease of process of forming the fresh air inlet 15 only in the outer layer 11 using a thermal perforator.

First Structural Example

In the first structural example, the layer structure was, in order from outside the container, random copolymer layer/EVOH layer/adhesion layer/LLDPE layer. For the random copolymer layer, a random copolymer of propylene and ethylene (model: NOVATEC EG7FTB, produced by Japan Polypropylene Corp., melting point of 150° C.) was used. For the EVOH layer, EVOH having a high melting point (model: Soarnol SF7503B, produced by Nippon Synthetic Chemical Industry Co., Ltd., melting point of 188° C., modulus of elasticity in bending of 2190 MPa) was used. According to the above various types of evaluation, excellent results were obtained in all evaluation categories.

Second Structural Example

In the second structural example, the layer structure was, in order from outside the container, random copolymer layer/reproduction layer/random copolymer layer/EVOH layer/adhesion layer/LLDPE layer. The reproduction layer is made from a material obtained by recycling burrs produced while molding a container and has composition very close to that of the random copolymer layer. The random copolymer layer and the EVOH layer were formed of materials same as those in the first structural example. According to the above various types of evaluation, excellent results were obtained in all evaluation categories.

Third Structural Example

In the third structural example, the layer structure was same as that in the first structural example while, for the EVOH layer, EVOH having a low melting point (model: Soarnol A4412, produced by Nippon Synthetic Chemical Industry Co., Ltd., melting point of 164° C.) was used. According to the above various types of evaluation, excellent results were obtained in all evaluation categories other than the outer layer processability. The outer layer processability was slightly worse than that in the first structural example. This result demonstrates that the difference of (melting point of EVOH)–(melting point of random copolymer layer) is preferably 15° C. or more.

First Comparative Structural Example

In the first comparative structural example, the layer structure was, in order from outside the container, LDPE layer/EVOH layer/adhesion layer/LLDPE layer. According to the above various types of evaluation, at least the rigidity and the heat resistance were low.

Second Comparative Structural Example

In the second comparative structural example, the layer structure was, in order from outside the container, HDPE layer/EVOH layer/adhesion layer/LLDPE layer. According to the above various types of evaluation, at least the restorability and the transparency were low.

Third Comparative Structural Example

In the third comparative structural example, the layer structure was, in order from outside the container, polypropylene layer/EVOH layer/adhesion layer/LLDPE layer. For the material for the polypropylene layer, a homopolymer of propylene having a melting point of 160° C. was used. For the EVOH layer, the material same as that in the first structural example was used. According to the above various types of evaluation, at least the impact resistance was low. In addition, the outer layer processability was worse than that in the first structural example.

Fourth Comparative Structural Example

In the fourth comparative structural example, the layer structure was, in order from outside the container, block copolymer layer/EVOH layer/adhesion layer/LLDPE layer. According to the above various types of evaluation, at least the transparency and the impact resistance were low.

Fifth Comparative Structural Example

In the fifth comparative structural example, the layer structure was, in order from outside the container, PET layer/EVOH layer/adhesion layer/LLDPE layer. According to the above various types of evaluation, at least the moldability and the heat resistance were low.

Sixth Comparative Structural Example

In the sixth comparative structural example, the layer structure was, in order from outside the container, polyamide layer/EVOH layer/adhesion layer/LLDPE layer. According to the above various types of evaluation, at least the moldability was low.

Seventh Comparative Structural Example

In the sixth comparative structural example, the layer structure was, in order from outside the container, polypropylene layer/polyamide layer/adhesion layer/LLDPE layer. According to the above various types of evaluation, at least the gas barrier properties and the moldability were low.

<Bend Test>

For an EVOH resin used as the EVOH layer, a bend test was performed using a Gelbo Flex Tester in accordance with ASTM F392 (manufactured by Brugger, KFT-C—Flex Durability Tester). The test environment was at 23° C. and 50% RH.

Firstly, a sample made from a single layer film in 28 cm×19 cm×30 μm was prepared.

Then, a longer side of the sample was wound around a pair of mandrels (diameter of 90 mm) arranged at an interval of 180 mm for fixation of both ends of the sample to the pair of mandrels A and B.

Then, while the mandrel A remained fixed, the mandrel B was gradually brought closer while being twisted and the twist was stopped when the twisting angle was 440 degrees and the horizontal movement distance reached 9.98 cm. After that, the horizontal movement of the mandrel B was continued and the horizontal movement was stopped when the horizontal movement distance after stopping twisting reached 6.35 cm. After that, the mandrel B was returned to the initial state by an operation opposite to above. Such operation was performed 100 times, followed by check on the presence of a pinhole. The results are indicated in Table 3.

TABLE 3

| | Number of Pinholes (number) | | |
|---|---|---|---|
| | n = 1 | n = 2 | Average |
| SF7503B | 0 | 0 | 0 |
| D2908 | 122 | 118 | 120 |

SF7503B in Table 3 is an EVOH resin used for the EVOH layer in the first structural example. Meanwhile, D2908 in Table 3 is Soarnol D2908 (model: Soarnol SF7503B, produced by Nippon Synthetic Chemical Industry Co., Ltd.), which is a general EVOH resin. Each EVOH resin was subjected to the test twice.

As indicated in Table 3, by the test above, many pinholes were created in D2908, whereas no pinhole was created at all in SF7503B and it was found that the latter was excellent in bending resistance more than a general EVOH resin.

4. Fourth Experimental Example

In the experimental example below, various delaminatable containers having different layer structures were produced by blow molding and such container thus obtained was filled with citrus flavored soy sauce, followed by still standing for one week, and then the total amount of citrus flavored soy sauce in the container was delivered for sensory evaluation of the citrus aroma in the delivered citrus flavored soy sauce. In addition, the shape of the inner bag of the container when the citrus flavored soy sauce is delivered was visually evaluated.

First Structural Example

In the first structural example, the layer structure was, in order from outside the container, random copolymer layer/ external EVOH layer (thickness of 25 μm)/adhesion layer (thickness of 150 μm)/internal EVOH layer (thickness of 15 μm). The external EVOH layer was formed of an EVOH resin added to a softening agent and the internal EVOH layer was formed of an EVOH resin not added to a softening agent. The adhesion layer was formed of a mixture of linear low density polyethylene and acid modified polyethylene at a mass ratio of 50:50. According to the above evaluation, intensity of the citrus aroma emitted by the delivered citrus flavored soy sauce was barely different. In addition, when the inner bag shrunk with the delivery of the citrus flavored soy sauce, the inner bag shrunk smoothly without being folded.

Second Structural Example

In the second structural example, the layer structure was same as that in the first structural example other than changing the thickness of the internal EVOH layer to 5 μm. According to the above evaluation, the intensity of the citrus aroma emitted by the delivered citrus flavored soy sauce was slightly worse than that in the first structural example. In addition, when the inner bag shrunk with the delivery of the citrus flavored soy sauce, the inner bag shrunk smoothly without being folded.

Third Structural Example

In the third structural example, the layer structure was same as that in the first structural example other than changing the thickness of the internal EVOH layer to 25 μm. According to the above evaluation, the intensity of the citrus aroma emitted by the delivered citrus flavored soy sauce was at an equivalent level to that in the first structural example. In addition, when the inner bag shrunk with the delivery of the citrus flavored soy sauce, the inner bag was prone to be folded than in the first structural example.

Fourth Structural Example

In the fourth structural example, the layer structure was same as that in the first structural example other than changing the thickness of the external EVOH layer to 75 μm and the thickness of the adhesion layer to 80 μm. According to the above evaluation, the intensity of the citrus aroma emitted by the delivered citrus flavored soy sauce was at an equivalent level to that in the first structural example. In addition, when the inner bag shrunk with the delivery of the citrus flavored soy sauce, the inner bag was prone to be folded than in the first structural example.

First Comparative Structural Example

In the first comparative structural example, the layer structure was same as that in the first structural example other than replacing the internal EVOH layer by a linear low density polyethylene layer (50 μm). According to the above evaluation, the intensity of the citrus aroma emitted by the delivered citrus flavored soy sauce was significantly worse than that in the first structural example. In addition, when the inner bag shrunk with the delivery of the citrus flavored soy sauce, the inner bag shrunk smoothly without being folded.

Second Comparative Structural Example

In the second comparative structural example, the layer structure was same as that in the first structural example other than replacing the internal EVOH layer by a polyamide layer (50 μm). According to the above evaluation, the intensity of the citrus aroma emitted by the delivered citrus flavored soy sauce was significantly worse than that in the first structural example. In addition, when the inner bag shrunk with the delivery of the citrus flavored soy sauce, the inner bag shrunk smoothly without being folded.

REFERENCE SIGNS LIST

1: Delaminatable Container, 3: Container Body, 5: Valve Member, 7: Storage Portion, 9: Mouth, 11: Outer Layer, 12: Outer Shell, 13: Inner Layer, 14: Inner Bag, 15: Fresh Air Inlet, 23: Cap, 27: Bottom Seal Protrusion

The invention claimed is:

1. A delaminatable container, comprising:
   a container body having an outer shell and an inner bag, the inner bag delaminating from the outer shell with a decrease in contents and being shrunk; and
   a valve member regulating entrance and exit of air between an external space of the container body and an intermediate space between the outer shell and the inner bag, wherein the container body includes a storage portion to store the contents and a mouth to discharge the contents from the storage portion,
   the outer shell includes a fresh air inlet communicating the intermediate space with the external space in the storage portion, and
   the valve member includes an axis inserted into the fresh air inlet, a lid provided on a side of the intermediate space in the axis and having a cross-sectional area greater than that of the axis, and a locking portion provided on a side of the external space in the axis and preventing entrance of the valve member to the intermediate space,
   wherein the lid has an end section having a tapered shape, and
   a boundary between the lid and the axis has a curved shape bulged towards outside.

2. The delaminatable container according to claim 1, wherein the axis is capable of sliding movement relative to the fresh air inlet.

3. The delaminatable container according to claim 1, wherein the lid is configured to substantially close the fresh air inlet when the outer shell is compressed.

4. The delaminatable container according to claim 1, wherein the lid has a smaller cross-sectional area as coming closer to the axis.

5. The delaminatable container according to claim 1, wherein the locking portion is configured to be capable of introducing air in the intermediate space when the outer shell is restored after compression.

6. The delaminatable container according to claim 1, wherein the locking portion has a projection or a groove on a side of the outer shell.

7. The delaminatable container according to claim 1, wherein the outer shell includes at least one of configurations (1) and (2) below:
   (1) the fresh air inlet is provided on an inclined surface of the outer shell; and
   (2) on an outer surface side of the outer shell, a flat region is provided with a width of 3 mm or more surrounding the fresh air inlet.

8. The delaminatable container according to claim 7, wherein
   the outer shell includes the configuration (1), and
   the inclined surface has an inclination angle from 45 to 89 degrees.

9. The delaminatable container according to claim 7, wherein
   the outer shell includes the configuration (2), and
   an inner surface of the outer shell has a radius of curvature of 200 mm or more in a range of 2 mm surrounding the fresh air inlet.

10. The delaminatable container according to claim 1, wherein
    the locking portion includes a pair of foundation portions and a bridge portion provided between the foundation portions, and
    the axis is provided in the bridge portion.

11. The delaminatable container according to claim 10, wherein the valve member is configured to, in a state of being mounted in the fresh air inlet, abut on the outer shell with the foundation portions and cause the bridge portion to deflect.

12. The delaminatable container according to claim 10, wherein the lid is provided with a tapered surface having a smaller cross-sectional area as coming closer to the axis.

13. The delaminatable container according to claim 12, wherein the tapered surface has an inclination angle from 15 to 45 degrees to a direction extending the axis.

* * * * *